United States Patent
Onuki

(10) Patent No.: US 10,456,621 B2
(45) Date of Patent: Oct. 29, 2019

(54) IMPACT POINT ESTIMATION APPARATUS

(71) Applicant: DUNLOP SPORTS CO. LTD., Kobe-shi, Hyogo (JP)

(72) Inventor: Masahide Onuki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 353 days.

(21) Appl. No.: 15/284,744

(22) Filed: Oct. 4, 2016

(65) Prior Publication Data

US 2017/0095691 A1     Apr. 6, 2017

(30) Foreign Application Priority Data

Oct. 5, 2015   (JP) .................................. 2015-197897

(51) Int. Cl.
A63F 9/24         (2006.01)
A63F 13/00        (2014.01)
(Continued)

(52) U.S. Cl.
CPC .......... *A63B 24/0003* (2013.01); *A63B 69/36* (2013.01); *G01P 1/06* (2013.01);
(Continued)

(58) Field of Classification Search
CPC ............................... A63F 13/57; A63F 13/573
See application file for complete search history.

(56) References Cited

U.S. PATENT DOCUMENTS 4,991,850 A   2/1991  Wilhlem
5,779,555 A   7/1998  Nomura et al.
(Continued)

FOREIGN PATENT DOCUMENTS

JP    9-215808 A    8/1997
JP    2012-130414 A  7/2012
(Continued)

OTHER PUBLICATIONS

Japanese Office Action, dated Dec. 4, 2018, for Japanese Application No. 2015-197897, with an English translation.
(Continued)

*Primary Examiner* — Milap Shah
*Assistant Examiner* — Jason Pinheiro
(74) *Attorney, Agent, or Firm* — Birch, Stewart, Kolasch & Birch, LLP

(57) ABSTRACT

Provided is an impact point estimation apparatus for estimating an impact point on a face surface of a head when a golf club having a grip, a shaft and the head is swung and hits a golf ball. The apparatus has an acquisition unit, a calculation unit, and an estimation unit. The acquisition unit is configured to acquire time series sensor data that is output from at least one of an angular velocity sensor and an acceleration sensor that is attached to at least one of the grip and the shaft. The calculation unit is configured to calculate a characteristic value of an initial stress wave that occurs due to impact from the sensor data acquired in an analysis period including an initial period after impact. The estimation unit is configured to estimate the impact point on the face surface, according to the characteristic value. The analysis period is before a predetermined short time period has elapsed from impact.

15 Claims, 11 Drawing Sheets

(51) Int. Cl.
    *G06F 17/00*     (2019.01)
    *G06F 19/00*     (2018.01)
    *A63B 24/00*     (2006.01)
    *A63B 69/36*     (2006.01)
    *G01P 1/00*     (2006.01)
    *G06K 9/00*     (2006.01)

(52) U.S. Cl.
    CPC .. *G06K 9/00342* (2013.01); *A63B 2208/0204* (2013.01); *A63B 2220/34* (2013.01); *A63B 2220/40* (2013.01); *A63B 2220/53* (2013.01); *A63B 2220/833* (2013.01)

(56) References Cited

U.S. PATENT DOCUMENTS

2002/0123386 A1*   9/2002   Perlmutter ......... A63B 24/0021
                                                                    473/223

2005/0032582 A1*   2/2005   Mahajan ................ A63B 69/00
                                                                  473/222
2010/0304877 A1   12/2010   Iwahashi et al.
2015/0185013 A1   7/2015   Abe

FOREIGN PATENT DOCUMENTS

| | | |
|---|---|---|
| JP | 2015-126813 A | 7/2015 |
| WO | WO 2006/090638 A | 8/2006 |
| WO | WO 2009/069698 A1 | 6/2009 |

OTHER PUBLICATIONS

Japanese Office Action, dated Feb. 26, 2019, for Japanese Application No. 2015-197897, with an English translation.

* cited by examiner

IMPACT POINT ESTIMATION APPARATUS

CROSS REFERENCE TO RELATED APPLICATIONS

This application claims a priority to Japanese Patent Application No. 2015-197897 filed on Oct. 5, 2015, which is hereby incorporated by reference in its entirety.

FIELD OF INVENTION

The present invention relates to an impact point estimation apparatus, method and program that estimate the point at which a golf ball impacts the face surface of the head of a golf club when the golf club is swung and hits the golf ball.

BACKGROUND

Heretofore, technologies that estimate the point at which the golf ball impacts the face surface when a golf club is swung have been proposed. For example, WO 2009/069698 (hereinafter called "Patent Literature 1") discloses an apparatus that estimates the impact point from the output signals of a plurality of sensors for detecting vibration at the time of ball strike that are attached to the back of the face surface.

SUMMARY OF INVENTION

However, with the method of Patent Literature 1, the sensors are attached to the back side of the face surface, and thus attaching the sensors may be difficult. Also, the presence of the sensors can significantly affect the golf swing.

An object of the present invention is to provide an impact point estimation apparatus, method and program that enable the point at which the ball impacts the face surface when a golf club is swung to be estimated in a simple and highly accurate manner.

An impact point estimation apparatus according to a first aspect of the present invention is an impact point estimation apparatus for estimating an impact point on a face surface of a head when a golf club having a grip, a shaft and the head is swung and hits a golf ball, the apparatus having an acquisition unit, a calculation unit, and an estimation unit. The acquisition unit is configured to acquire time series sensor data that is output from at least one of an angular velocity sensor and an acceleration sensor that is attached to at least one of the grip and the shaft. The calculation unit is configured to calculate a characteristic value of an initial stress wave that occurs due to impact, based on the sensor data acquired in an analysis period including an initial period after impact. The estimation unit is configured to estimate the impact point on the face surface, according to the characteristic value. The analysis period is before a predetermined short time period has elapsed from impact.

Here, the short time period is typically 0.01 seconds. However, since this value of 0.01 seconds may be affected by factors such as the characteristics of the waveform of the initial stress wave after impact, the analysis technique thereof, and the accuracy with which the time of impact is detected (deviation from the actual time of impact), the short time period may be longer than 0.01 seconds.

An impact point estimation apparatus according to a second aspect of the present invention is the impact point estimation apparatus according to the first aspect, in which the analysis period is before 0.01 seconds have elapsed from impact.

An impact point estimation apparatus according to a third aspect of the present invention is the impact point estimation apparatus according to the second aspect, in which the analysis period is before 0.005 seconds have elapsed from impact.

An impact point estimation apparatus according to a fourth aspect of the present invention is the impact point estimation apparatus according to any of the first to third aspects, in which the characteristic value is a characteristic value of a first wave of the stress wave that occurs due to impact.

An impact point estimation apparatus according to a fifth aspect of the present invention is the impact point estimation apparatus according to any of the first to fourth aspects, in which the characteristic value includes an amplitude of angular velocity data acquired in the analysis period or a value that depends on the amplitude.

An impact point estimation apparatus according to a sixth aspect of the present invention is the impact point estimation apparatus according to any of the first to fifth aspects, in which the estimation unit estimates the impact point, according to a head speed when the golf club is swung, in addition to the characteristic value.

An impact point estimation apparatus according to a seventh aspect of the present invention is the impact point estimation apparatus according to any of the first to sixth aspects, in which the acquisition unit acquires angular velocity data about an x-axis and angular velocity data about a z-axis. The x-axis and the z-axis are included in a plane that is generally parallel to the face surface.

An impact point estimation apparatus according to an eighth aspect of the present invention is the impact point estimation apparatus according to the seventh aspect, in which the z-axis extends parallel to a direction in which the shaft extends.

An impact point estimation apparatus according to a ninth aspect of the present invention is the impact point estimation apparatus according to any of the first to eighth aspects, in which the estimation unit calculates one or a plurality of the characteristic values based on the sensor data acquired in the analysis period, and estimates the impact point, based on a predetermined regression equation or multiple regression equation in which the one or plurality of characteristic values are explanatory variables and the impact point is an objective variable.

An impact point estimation method according to a tenth aspect of the present invention is an impact point estimation method for estimating an impact point on a face surface of a head when a golf club having a grip, a shaft and the head is swung and hits a golf ball, the method including the following steps.

(1) A step of acquiring time series sensor data, using at least one of an angular velocity sensor and an acceleration sensor that is attached to at least one of the grip and the shaft.

(2) A step of calculating a characteristic value of an initial stress wave that occurs due to impact, based on the sensor data acquired in an analysis period including an initial period after impact.

(3) A step of estimating the impact point on the face surface, according to the characteristic value.

Note that the analysis period is before 0.01 seconds have elapsed from impact.

An impact point estimation program according to an eleventh aspect of the present invention is an impact point estimation program for estimating an impact point on a face surface of a head when a golf club having a grip, a shaft and the head is swung and hits a golf ball, the program causing a computer to execute the following steps.

(1) A step of acquiring time series sensor data that is output from at least one of an angular velocity sensor and an acceleration sensor that is attached to at least one of the grip and the shaft.

(2) A step of calculating a characteristic value of an initial stress wave that occurs due to impact, based on the sensor data acquired in an analysis period including an initial period after impact.

(3) A step of estimating the impact point on the face surface, according to the characteristic value.

The analysis period is before 0.01 seconds have elapsed from impact.

An impact point estimation apparatus according to a twelfth aspect of the present invention is an impact point estimation apparatus for estimating an impact point on a face surface of a head when a golf club having a grip, a shaft and the head is swung and hits a golf ball, the apparatus including an acquisition unit, a calculation unit, and an estimation unit. The acquisition unit is configured to acquire time series sensor data that is output from at least one of an angular velocity sensor and an acceleration sensor that is attached to at least one of the grip and the shaft. The calculation unit is configured to calculate at least one characteristic value of a first wave to a third wave of a stress wave that occurs due to impact, based on the sensor data acquired in an analysis period including an initial period after impact. The estimation unit is configured to estimate the impact point on the face surface, according to the characteristic value.

An impact point estimation apparatus according to a thirteenth aspect of the present invention is the impact point estimation apparatus according to the twelfth aspect, in which the calculation unit calculates the characteristic value of the first wave of the stress wave that occurs due to impact, based on the sensor data acquired in the analysis period.

According to the present invention, the impact point is estimated from the output value of at least one of an angular velocity sensor and an acceleration sensor that is attached to at least one of the grip and the shaft. Accordingly, the impact point of the ball on the face surface can be estimated in a simple manner. Also, the sensor data that is targeted for analysis is time series sensor data acquired in an analysis period. The analysis period includes an initial period after impact, and is a period before a predetermined short time period (typically, 0.01 s) has elapsed from impact. The above analysis period is a period in which the initial few waves (from the first wave to around the third wave at most) of the stress wave that occurs due to impact and propagates from the face surface through the shaft to the sensor appear. Normally, a large number of the waves start to interfere after this initial analysis period, and it can become difficult to analyze the characteristics of the stress wave. However, here, the above analysis period is targeted for analysis, thus facilitating the analysis of the characteristics of the stress wave, and consequently enabling the impact point of the ball to be estimated in a simple and highly accurate manner.

DETAILED DESCRIPTION OF THE PREFERRED EMBODIMENTS

Hereinafter, an impact point estimation apparatus, method and program that estimate the impact point at the time of a golf swing according to one embodiment of the present invention will be described, with reference to the drawings.

1. Overall Analysis System Configuration

Figure 1:
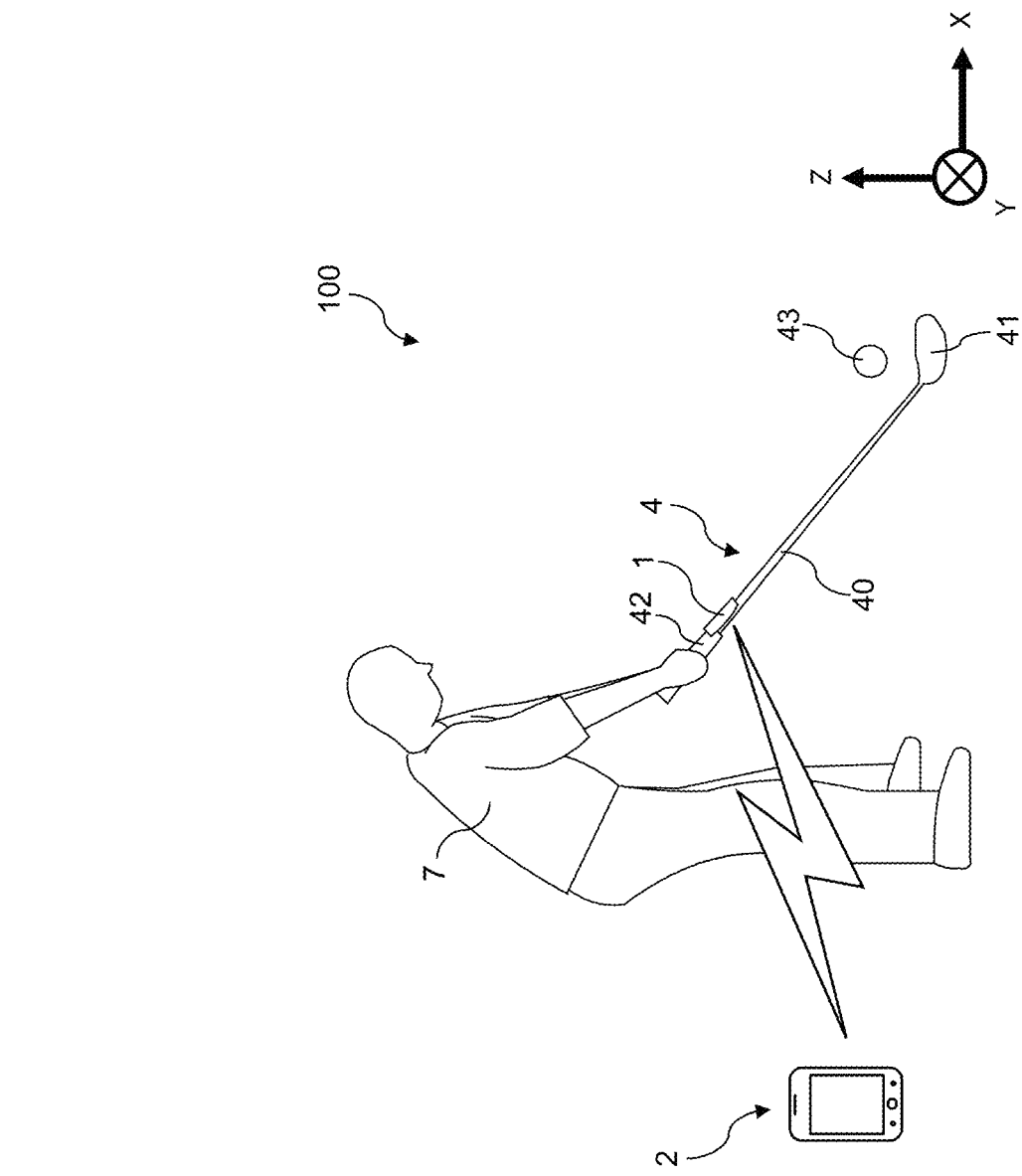
FIG. 1 is a diagram showing a swing analysis system that is provided with an analysis apparatus according to one embodiment of the present invention.
Figure 2:
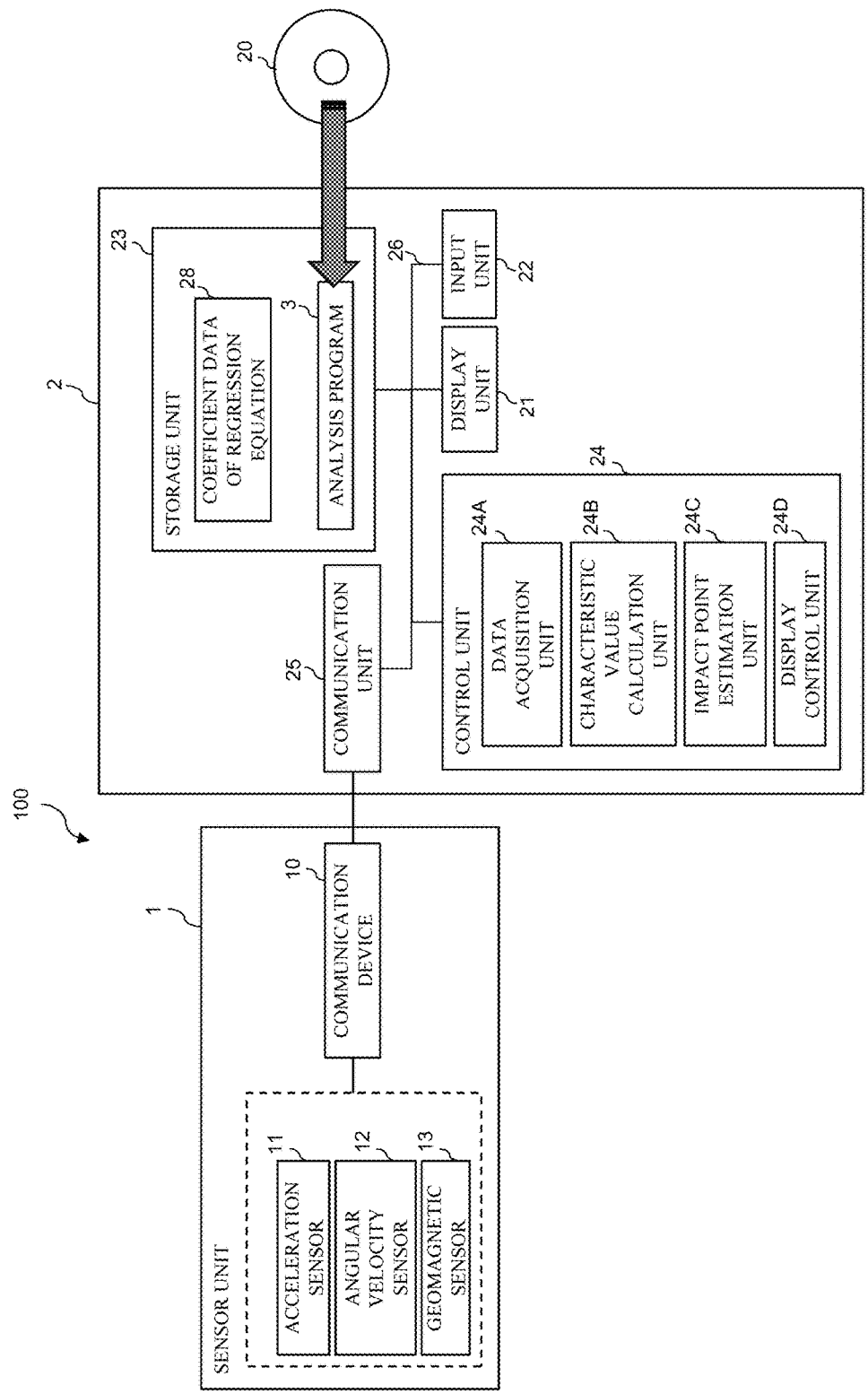
FIG. 2 is a functional block diagram of the swing analysis system of FIG. 1.

The overall configuration of a swing analysis system 100 that is provided with an analysis apparatus 2, which is an impact point estimation apparatus according to the present embodiment, is shown in FIGS. 1 and 2. The analysis apparatus 2 is an apparatus that analyzes a golf swing. More specifically, the analysis apparatus 2 has a function of estimating the impact point (impact position) of a golf ball 43 on a face surface 41a (see FIG. 6) of a head 41 when a golfer 7 swings a golf club 4 and hits the golf ball 43. Information on the impact point estimated by the analysis apparatus 2 can be used to, for example, grasp how often the golfer 7 is hitting the ball 43 in the sweet area during golf practice. Alternatively, this information can even be used to assist in fitting the golf club 4. Collection of the data for analysis is performed by a sensor unit 1 attached to a shaft 40 of the golf club 4, and the analysis apparatus 2, together with this sensor unit 1, constitutes the swing analysis system 100.

Hereinafter, the flow of golf swing analysis processing will be described, after describing the configurations of the sensor unit 1 and the analysis apparatus 2.

1-1. Configuration of Sensor Unit

Figure 3:
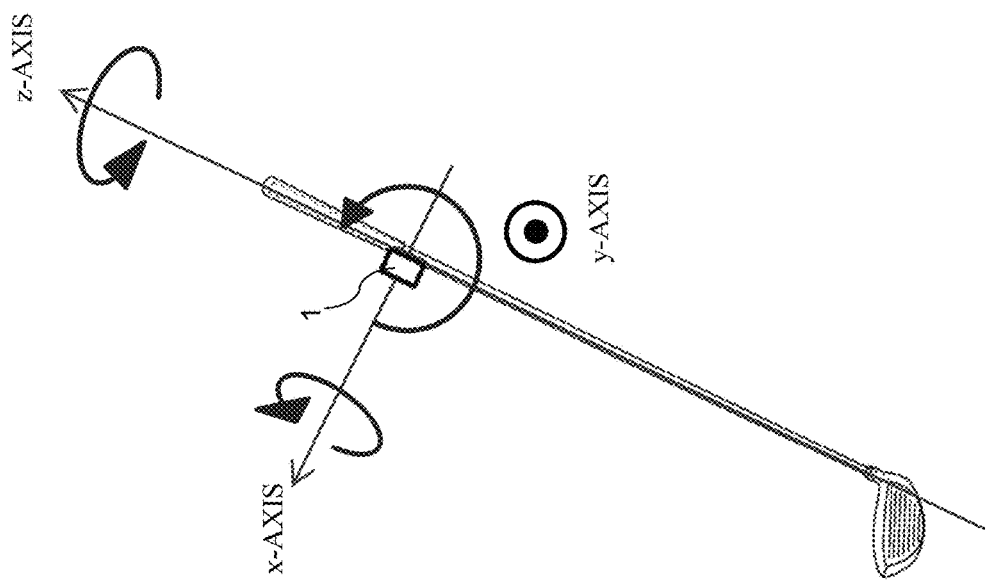
FIG. 3 is a diagram illustrating an xyz local coordinate system that is centered on a vicinity of a grip of a golf club.

The sensor unit 1 is, as shown in FIGS. 1 and 3, attached to the shaft 40 of the golf club 4 at a position near a grip 42, and measures the behavior of the attachment position, that is, the general behavior of the grip 42. The sensor unit 1 according to the present embodiment is configured to be detachable, and can be attached to any suitable golf club 4. Note that the golf club 4 is a typical golf club, and is constituted by the shaft 40, the head 41 provided at one end of the shaft 40, and the grip 42 provided at the other end of the shaft 40. The sensor unit 1 is configured to be small and lightweight, so as to not interfere with the swing motion. As shown in FIG. 2, an acceleration sensor 11, an angular velocity sensor 12 and a geomagnetic sensor 13 are mounted in the sensor unit 1 according to the present embodiment.

Also, a communication device 10 for transmitting sensor data that are output to the external analysis apparatus 2 from these sensors 11 to 13 is also mounted in the sensor unit 1. Note that, in the present embodiment, the communication device 10 is a wireless communication device so as to not interfere with the swing motion, but a configuration may be adopted in which a wired communication device is connected to the analysis apparatus 2 via a cable.

The acceleration sensor 11, the angular velocity sensor 12, and the geomagnetic sensor 13 respectively measure acceleration, angular velocity, and geomagnetism in an xyz local coordinate system. More specifically, the acceleration sensor 11 measures accelerations $a_x$, $a_y$ and $a_z$ in the x-axis, y-axis and z-axis directions. The angular velocity sensor 12 measures angular velocities $\omega_x$, $\omega_y$ and $\omega_z$ about the x-axis, y-axis and z-axis. The geomagnetic sensor 13 measures geomagnetisms $m_x$, $m_y$ and $m_z$ in the x-axis, y-axis and z-axis directions. These sensor data are acquired as time series data of a predetermined sampling period $\Delta t$. A sampling frequency ($1/\Delta t$) is preferably 5 kH or more, and more preferably 10 kH or more. Note that the xyz local coordinate system is a 3-axis orthogonal coordinate system that is defined as shown in FIG. 3. That is, the z-axis coincides with the direction in which the shaft 40 extends, and the direction from the head 41 toward the grip 42 is the z-axis positive direction. The y-axis is oriented so as to be aligned as closely as possible with the ball flight direction at address of the golf club 4, that is, so as to be generally aligned with the face-back direction. The x-axis is oriented so as to be orthogonal to the y-axis and the z-axis, that is, so as to be generally aligned with the toe-heel direction, and the direction from the heel side toward the toe side is the x-axis positive direction. Accordingly, the x-axis and the z-axis will be included within a plane that is generally parallel to the face surface 41a.

Note that the toe-heel direction, the face-back direction and the top-sole direction are defined on the basis of a reference state. The reference state is in a state in which the direction in which the shaft 40 extends is included in a plane that is perpendicular (hereinafter, reference perpendicular plane) to the horizontal plane, and the head 41 is placed on the horizontal plane at a predetermined lie angle and a predetermined real loft angle. The direction of the line of intersection of the reference perpendicular plane and the horizontal plane is the toe-heel direction, and the direction that is perpendicular to the toe-heel direction and parallel to the horizontal plane is the face-back direction. Also, the direction that is perpendicular to the horizontal plane is called the top-sole direction. Note that in the description of the present embodiment, unless particularly stated otherwise, "right-left" means the toe-heel direction, with the toe side being left and the heel side being right. Also, unless particularly stated otherwise, "up-down" means the top-sole direction, with the top side being up and the sole side being down.

In the present embodiment, the sensor data from the acceleration sensor 11, the angular velocity sensor 12 and the geomagnetic sensor 13 are transmitted to the analysis apparatus 2 in real time via the communication device 10. However, a configuration may be adopted in which, for example, the sensor data are stored in a storage device within the sensor unit 1, and after the end of swing motion the sensor data are retrieved from the storage device and transferred to the analysis apparatus 2.

1-2. Configuration of Analysis Apparatus

The configuration of the analysis apparatus 2 will be described, with reference to FIG. 2. The analysis apparatus 2, in terms of hardware, is a general-purpose personal computer, and is, for example, realized as a tablet computer, a smart phone, a laptop computer or a desktop computer. The analysis apparatus 2 is manufactured by installing an analysis program 3 on a general-purpose computer from a computer-readable recording medium 20 such as a CD-ROM or a USB memory, or via a network such as the Internet. The analysis program 3 is an impact point estimation program according to the present embodiment, and is software that analyzes a golf swing based on sensor data that are sent from the sensor unit 1. A function of estimating the impact point on the face surface 41a is implemented in the analysis program 3. The analysis program 3 causes the analysis apparatus 2 to execute operations which will be discussed later.

The analysis apparatus 2 is provided with a display unit 21, an input unit 22, a storage unit 23, a control unit 24, and a communication unit 25. These units 21 to 25 are connected via a bus line 26, and are able to communicate with each other. In the present embodiment, the display unit 21 is constituted by a liquid crystal display or the like, and displays information which will be discussed later to a user. Note that a user as referred to here is a generic term for a person who requires the analysis results, such as the golfer 7 or his or her instructor. Also, the input unit 22 can be constituted by a mouse, a keyboard, a touch panel and the like, and accepts operations performed by the user on the analysis apparatus 2.

The storage unit 23 is constituted by a nonvolatile storage device such as a flash memory or a hard disk. Sensor data that is sent from the sensor unit 1 is saved to the storage unit 23, in addition to the analysis program 3 being stored therein. Also, data (hereinafter, coefficient data) 28 indicating the coefficients of a regression equation that is used in estimating the impact point is stored in the storage unit 23. The coefficient data 28 will be discussed in detail later. The communication unit 25 is a communication interface that enables communication between the analysis apparatus 2 and an external apparatus, and receives data from the sensor unit 1.

The control unit 24 can be constituted from a CPU, a ROM, a RAM, and the like. The control unit 24 operates in a virtual manner as a data acquisition unit 24A, a characteristic value calculation unit 24B, an impact point estimation unit 24C, and a display control unit 24D, by reading out and executing the analysis program 3 that is in the storage unit 23. The operations of each of the units 24A to 24D will be discussed in detail later.

2. Golf Swing Analysis Processing

Next, golf swing analysis processing by the swing analysis system 100 will be described. This analysis processing includes two types of processing, namely, data collection processing for collecting sensor data that are output from the sensor unit 1, and impact point estimation processing for estimating the impact point using the analysis apparatus 2, based on the sensor data. Hereinafter, these two types of processing will be described in order.

2-1. Data Collection Processing

In the data collection processing, the golf club 4 with the abovementioned sensor unit 1 attached is swung by the golfer 7. At this time, the sensor data of the accelerations $a_x$, $a_y$ and $a_z$, angular velocities $\omega_x$, $\omega_y$ and $\omega_z$ and the geomagnetisms $m_x$, $m_y$ and $m_z$ during the golf swing are detected by the sensor unit 1. Also, these sensor data are transmitted to the analysis apparatus 2 via the communication device 10 of the sensor unit 1. On the other hand, on the analysis apparatus 2 side, the data acquisition unit 24A receives these sensor data via the communication unit 25, and stores the sensor data in the storage unit 23. In the present embodiment, time series sensor data at least from address to finish are collected.

Figure 4D:
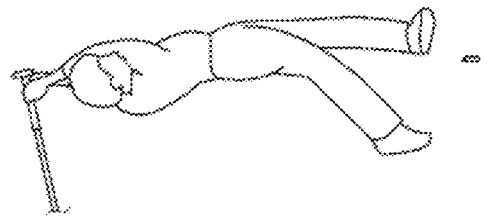
FIG. 4D is a diagram showing a finish state.
Figure 4C:
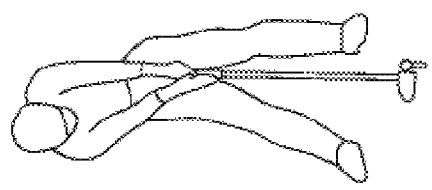
FIG. 4C is a diagram showing an impact state.
Figure 4B:
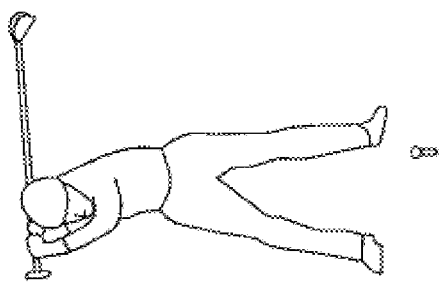
FIG. 4B is a diagram showing a top state.
Figure 4A:
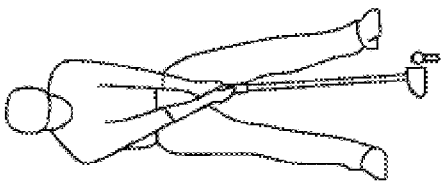
FIG. 4A is a diagram showing an address state.

Note that the swing motion of a golf club generally proceeds in order of address, top, impact and finish. Address refers to the initial state in which the head 41 of the golf club 4 is disposed near the ball, as shown in FIG. 4A, and top refers to the state in which the head 41 is swung up the furthest after the golf club 4 is taken back from address, as shown in FIG. 4B. Impact refers to the momentary state in which the head 41 impacts the ball after the golf club 4 is swung down from top, as shown in FIG. 4C, and finish refers to the state in which the golf club 4 is swung through to the front after impact, as shown in FIG. 4D.

2-2. Impact Point Estimation Processing

Figure 5:
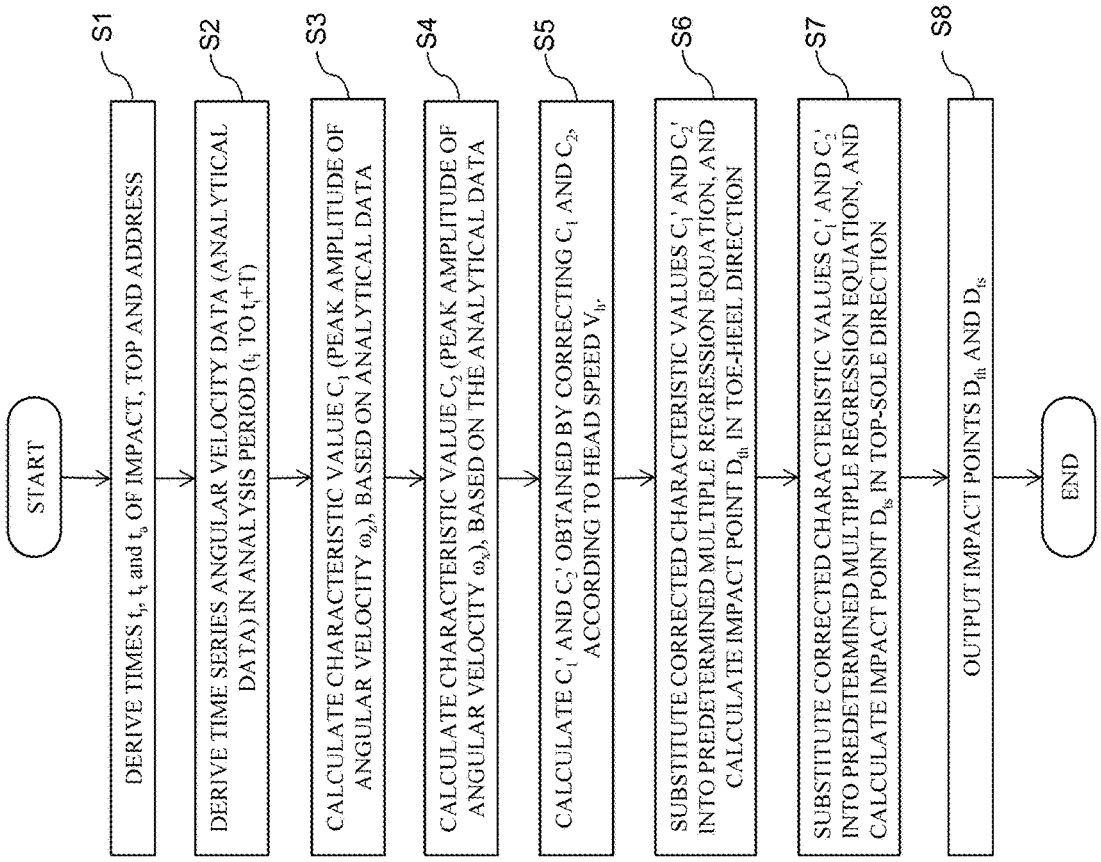
FIG. 5 is a flowchart showing the flow of impact point estimation processing.
Figure 6:
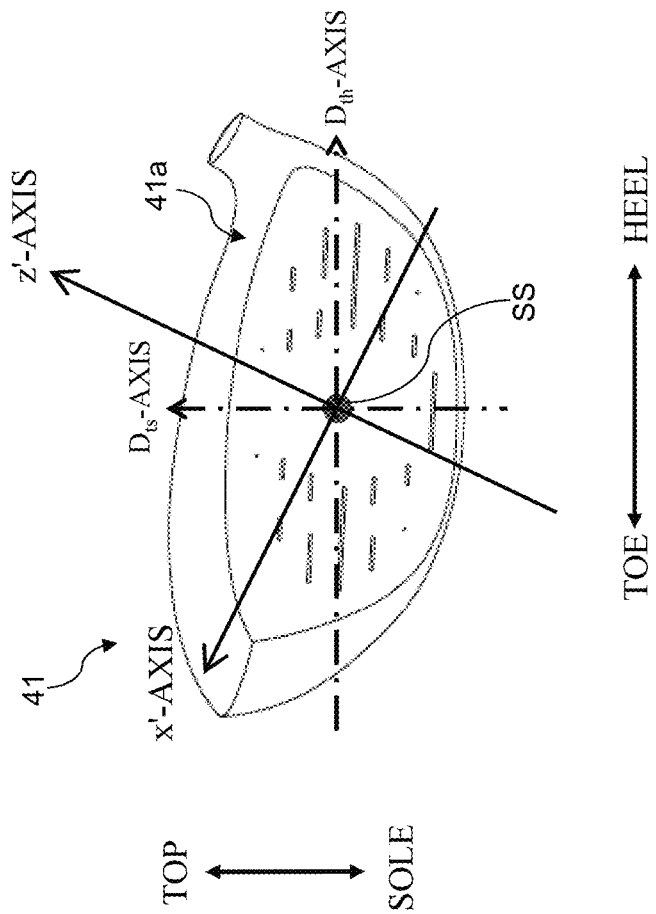
FIG. 6 is a diagram showing a face surface of a head.

Next, impact point estimation processing that is executed by the analysis apparatus 2 will be described, with reference to FIG. 5. In the present embodiment, coordinates ($D_{th}$, $D_{ts}$) of the impact point in a $D_{th}$-$D_{ts}$ plane that are defined on the face surface 41a and shown in FIG. 6 are specified. The origin of the $D_{th}$-$D_{ts}$ plane is the sweet spot SS. A $D_{th}$-axis extends in the toe-heel direction, and the direction from the toe side toward the heel side is the $D_{th}$-axis positive direction. Also, a $D_{ts}$-axis extends in the top-sole direction, and the direction from the sole side toward the top side is the $D_{ts}$-axis positive direction.

2-2-1. Principle

Before describing the flow of processing of FIG. 5 in detail, the principle according to which impact point estimation becomes possible as a result of the processing of FIG. 5 will be described.

The inventors focused on the stress wave that occurs due to impact and propagates through the shaft 40 to the sensor unit 1, as an analysis target for estimating the impact point at impact. In particular, the inventors conceived that analysis of the characteristics of the stress wave is facilitated by analyzing the waveform of the stress wave of a period consisting of the initial few milliseconds to tens of milliseconds after impact. This is because a large number of the waves begin to interfere after this initial period, and it can become difficult to capture the characteristics of the stress wave. Also, the inventors conceived that the data of this initial period is superior in terms of being able to eliminate the effects of the golf club 4 touching the body of the golfer 7 at finish.

Here, for convenience of description, a z'-x' plane is defined on the face surface 41a (see FIG. 6), in addition to the abovementioned $D_{th}$-$D_{ts}$ plane. The z'-x' plane is defined such that the z'-axis is parallel to the z-axis and the x'-axis is parallel to the x-axis, with the origin being at the sweet spot SS. Strictly speaking, the z'-x' plane is, however, defined on a plane obtained by projecting the face surface 41a onto a plane perpendicular to the y-axis.

At this time, if the impact point is in a first quadrant within the z'-x' plane, the head 41 rotates in the negative direction about the z'-axis, and rotates in the positive direction about the x'-axis. If the impact point is in the second quadrant, the head 41 rotates in the negative direction about the z'-axis, and rotates in the negative direction about the x'-axis. If the impact point is in the third quadrant, the head 41 rotates in the positive direction about the z'-axis, and rotates in the negative direction about the x'-axis. If the impact point is in the fourth quadrant, the head 41 rotates in the positive direction about the z'-axis, and rotates in the positive direction about the x'-axis.

When the head 41 rotates about the z'-axis, a stress wave caused by torsional deformation due to the rotation occurs in the shaft 40, and propagates through the shaft 40 to the sensor unit 1 which is near the grip 42. Rotational movement due to the stress wave occurs in the sensor unit 1, and the rotational movement is detected by the angular velocity sensor 12 as angular velocity $\omega_z'$ about the z'-axis. Angular velocity $\omega_z'$ is detected as a positive or negative value according to the direction of rotation about the z'-axis. Also, the magnitude of angular velocity $\omega_z'$ is roughly proportional to the distance from the z'-axis to the impact point.

On the other hand, when the head 41 rotates about the x'-axis, a stress wave caused by bending deformation about the x'-axis due to the rotation occurs in the shaft 40, and propagates through the shaft 40 to the sensor unit 1 which is near the grip 42. Rotational movement due to the stress wave occurs in the sensor unit 1, and the rotational movement is detected by the angular velocity sensor 12 as angular velocity $\omega_x'$ about the x'-axis. Unlike the rotation of the head 41 about the z'-axis, however, even if the impact point is the sweet spot SS and the head 41 does not rotate, bending deformation will occur in the shaft 40 in the vicinity of the head 41, since the head 41 decelerates relative to the movement of the shaft 40. In other words, there is no change in sign (positive/negative) with respect to the impact point being at the sweet spot SS. However, since the amplitude of the stress wave will be roughly proportional to the distance from the x'-axis to the impact point, angular velocity $\omega_x'$ that is detected by the angular velocity sensor 12 is also roughly proportional to the distance from the x'-axis to the impact point.

From the above, the inventors conceived that the impact point can be estimated by measuring angular velocities $\omega_x'$ and $\omega_z'$ under the influence of the stress wave during the initial period after impact. In order to verify this, the inventors performed simulation.

Also, the amplitudes of angular velocities $\omega_x'$ and $\omega_z'$ each depend on the reaction force at the time that the head 41 impacts the ball 43, and are roughly proportional to head speed. Accordingly, the inventors conceived that the impact point can be estimated with higher accuracy if indices that affect the reaction force when the head 41 impacts the ball 43, such as head speed, are known.

Figure 7:
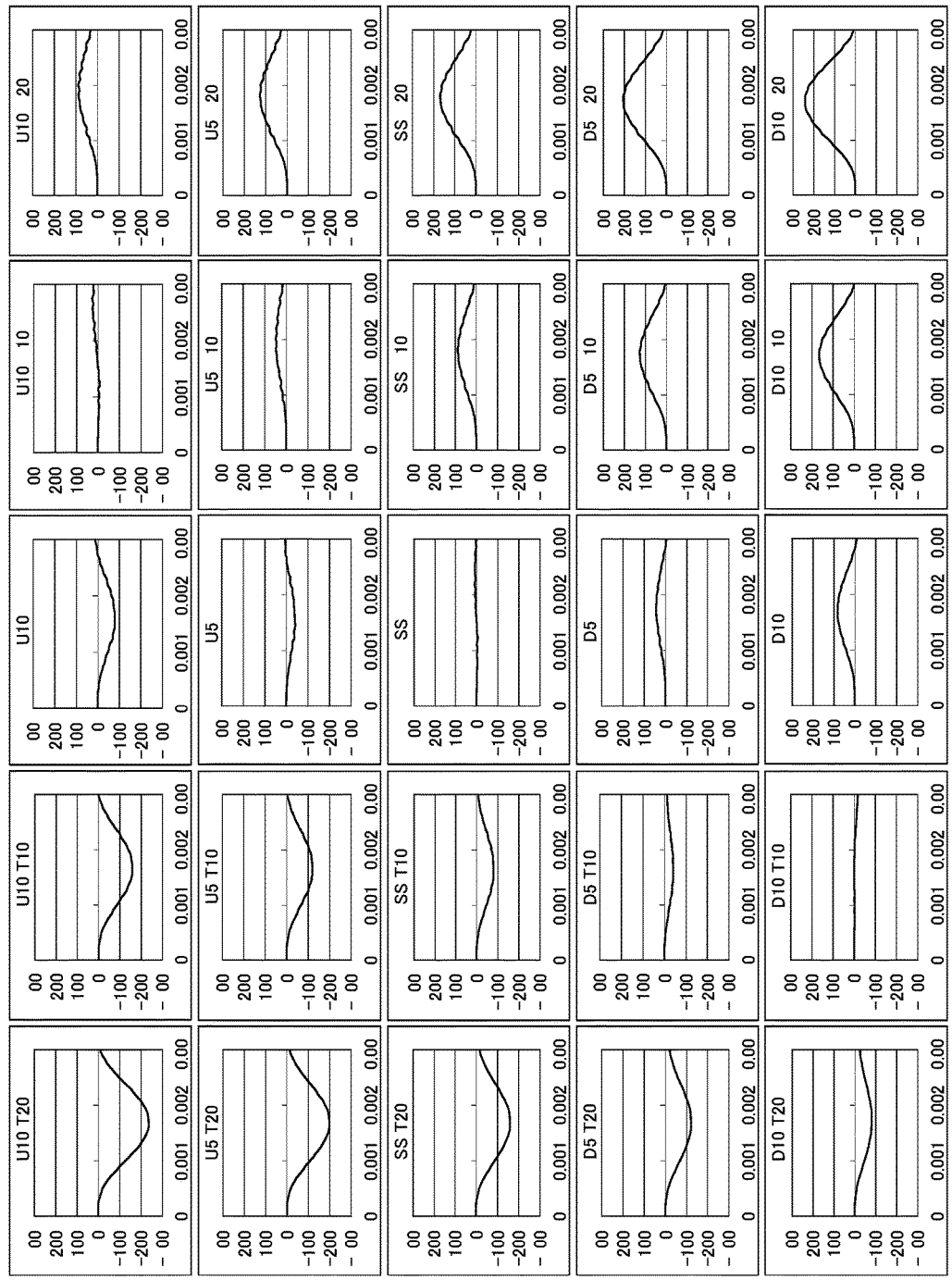
FIG. 7 is a series of graphs showing a result of simulating angular velocity $\omega_z'$ under the influence of stress waves at various impact points.

FIG. 7 is a series of graphs of angular velocity $\omega_z'$ at various impact points that were obtained by simulation. The vertical axis of each graph is in units of deg/s, and the horizontal axis is time and represents a period from impact to 0.003 s. This simulation was performed with the head speed at impact set to 40 m/s. Also, the center graph is a graph obtained when the impact point is at the sweet spot SS. With reference to this graph, the graph that is one place to the right is a graph obtained when the impact point is set to a position that is 10 mm to the heel side from the sweet spot SS, and the graph that is two places to the right is a graph obtained when the impact point is set to a position that is 20 mm to the heel side from the sweet spot SS. Similarly, the graph that is one place to the left is a graph obtained when the impact point is set to a position that is 10 mm to the toe side from the sweet spot SS, and the graph that is two places to the left is a graph obtained when the impact point is set to a position that is 20 mm to the toe side from the sweet spot SS. Also, with reference to the graph at the sweet spot SS, the graph that is one place up is a graph obtained when the impact point is set to a position that is 5 mm upward from the sweet spot SS, and the graph that is two places up is a graph obtained when the impact point is set to a position that is 10 mm upward from the sweet spot SS. Similarly, the graph that is one place down is a graph obtained when the impact point is set to a position that is 5 mm downward from the sweet spot SS, and the graph that is two places down is a graph obtained when the impact point is set to a position that is 10 mm downward from the sweet spot SS.

From this diagram it is evident that a peak of $\omega_z'$ is substantially not detected when the impact point is at the sweet spot SS, whereas a larger positive peak of $\omega_z'$ is detected as the impact point shifts toward the heel side and a larger negative peak of $\omega_z'$ is detected as the impact point shifts toward the toe side. Also, in the area on the toe side, a larger negative peak is detected as the impact point shifts up, and in the area of the heel side, a larger positive peak is detected as the impact point shifts down. Accordingly, it is evident that impact points $D_{th}$ and $D_{ts}$ are both correlated with $\omega_z'$.

Figure 8:
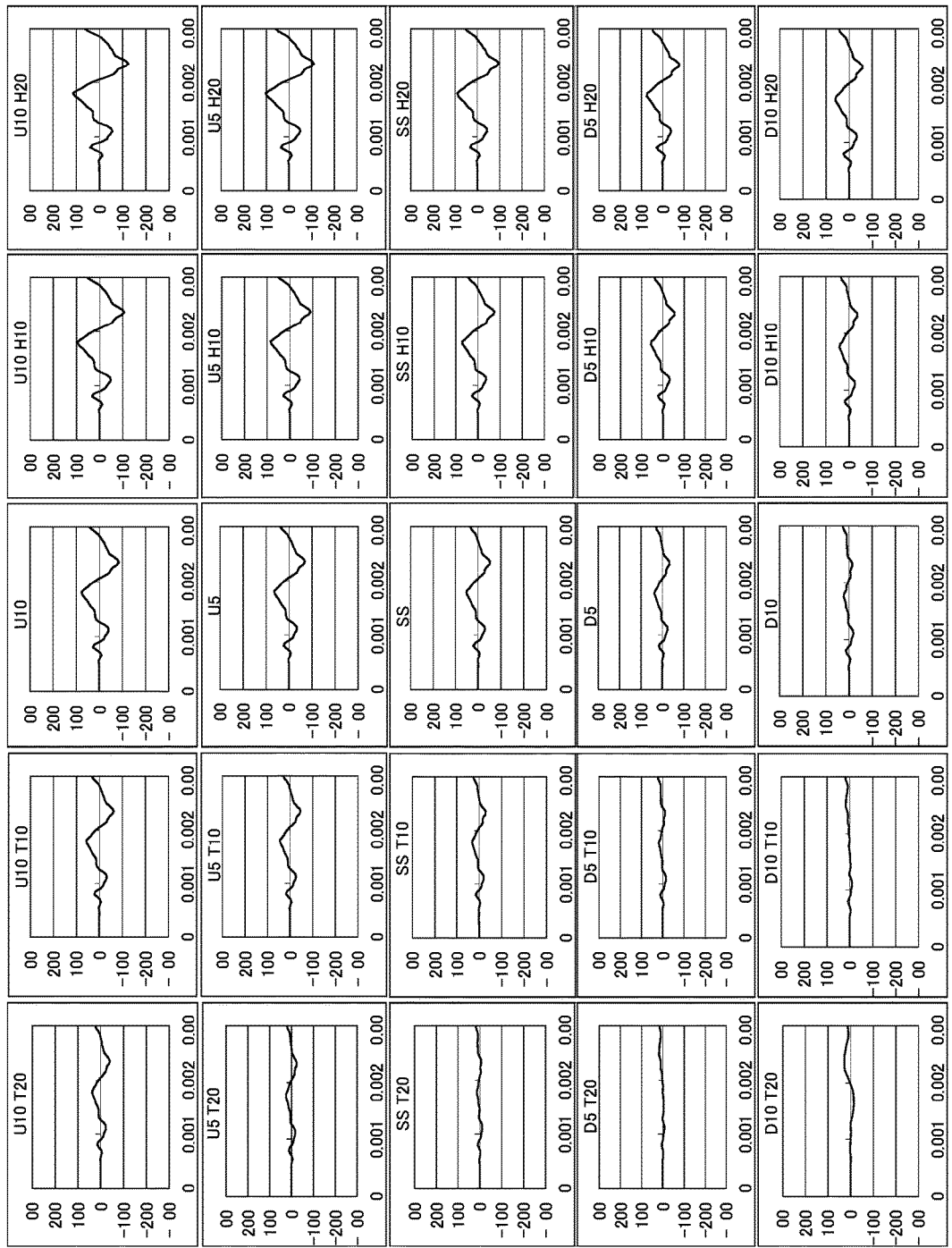
FIG. 8 is a series of graphs showing a result of simulating angular velocity $\omega_x'$ under the influence of stress waves at various impact points.
Figure 9A:
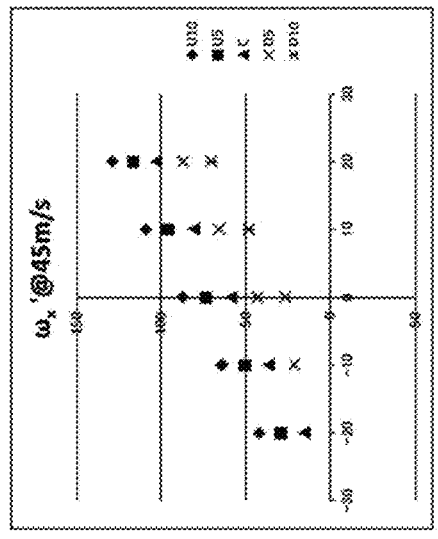
FIGS. 9A to 9F are each a graph showing a result of simulating angular velocities $\omega_x'$ and $\omega_z'$ under the influence of stress waves at different head speeds.
Figure 9B:
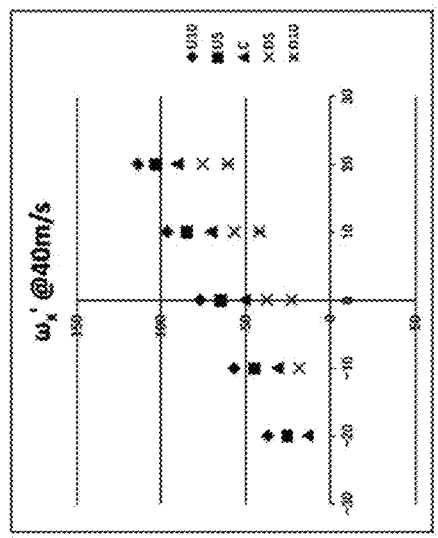
Figure 9C:
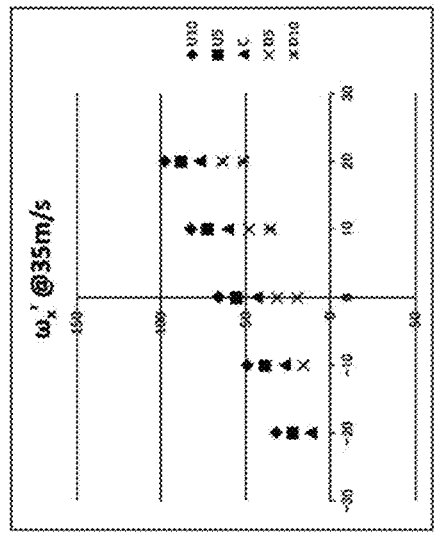
Figure 9D:
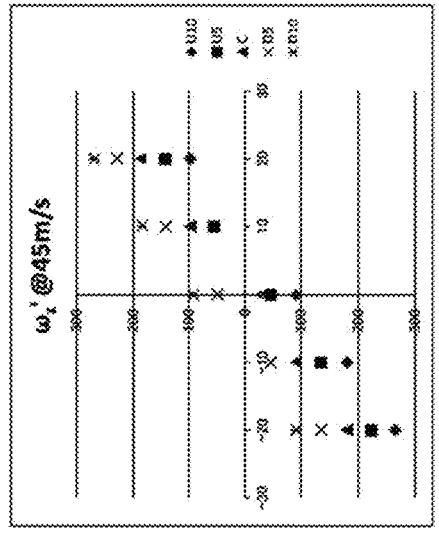
Figure 9E:
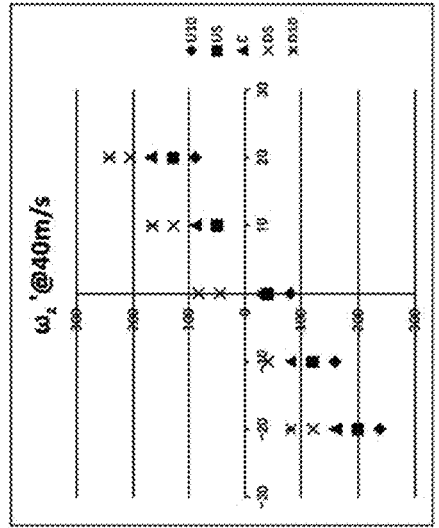
Figure 9F:
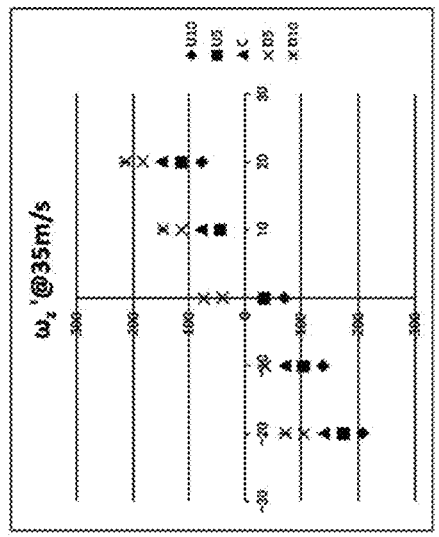

FIG. 8 shows a series of graphs of angular velocity $\omega_x'$ at various impact points that were obtained by simulation. Similarly to the case of angular velocity $\omega_z'$, the vertical axis of each graph is in units of deg/s, and the horizontal axis is time and represents a period from impact to 0.003 s. This simulation was performed with the head speed at impact set to 40 m/s. Also, the center graph is a graph obtained when the impact point is at the sweet spot SS. With reference to this graph, the graph that is one place to the right is a graph obtained when the impact point is set to a position that is 10 mm to the heel side from the sweet spot SS, and the graph that is two places to the right is a graph obtained when the impact point is set to a position that is 20 mm to the heel side from the sweet spot SS. Similarly, the graph that is one place to the left is a graph obtained when the impact point is set to a position that is 10 mm to the toe side from the sweet spot SS, and the graph that is two places to the left is a graph obtained when the impact point is set to a position that is 20 mm to the toe side from the sweet spot SS. Also, with reference to the graph at the sweet spot SS, the graph that is one place up is a graph obtained when the impact point is set to a position that is 5 mm upward from the sweet spot SS, and the graph that is two places up is a graph obtained when the impact point is set to a position that is 10 mm upward from the sweet spot SS. Similarly, the graph that is one place down is a graph obtained when the impact point is set to a position that is 5 mm downward from the sweet spot SS, and the graph that is two places down is a graph obtained when the impact point is set to a position that is 10 mm downward from the sweet spot SS.

From this diagram it is evident that a larger positive peak of $\omega_x'$ is detected as the impact point shifts toward the heel side, and a smaller positive peak of $\omega_x'$ is detected as the impact point shifts toward the toe side. Also, a larger peak is detected as the impact point shifts up, and a smaller positive peak is detected as the impact point shifts down. Accordingly, it is evident that impact points $D_{th}$ and $D_{ts}$ are both correlated with $\omega_x'$.

It was evident from the above simulation results that estimation of impact points $D_{th}$ and $D_{ts}$ is possible if the values of angular velocities $\omega_x'$ and $\omega_z'$ or $\omega_x$ and $\omega_z$ are known.

Also, FIGS. 9A to 9F show a series of graphs verifying the influence of head speed on angular velocities $\omega_x'$ and $\omega_z'$. The upper graphs (FIGS. 9A to 9C) are graphs showing the relationship between the impact point [mm] and $\omega_x'$ [deg/s] in the case where the head speed is 35 m/s, 40 m/s and 45 m/s in order from the left. The lower graphs (FIGS. 9D to 9F) are graphs showing the relationship between the impact point [mm] and $\omega_z'$ [deg/s] in the case where the head speed is 35 m/s, 40 m/s and 45 m/s in order from the left. The horizontal axis of each graph represents impact point $D_{th}$, and the direction to the right is toward the heel side. Also, U10 and U5 respectively represent impact points that are 10 mm and 5 mm above an up-down position that is the same as the sweet spot SS, C represents impact points that are at an up-down position that is the same as the sweet spot SS, D5 and D10 respectively represent impact points that are 5 mm and 10 mm below an up-down position that is the same as the sweet spot SS. Also, the value of angular velocity $\omega_z'$ that is shown in the graphs is the maximum value or minimum value (peak amplitude) of angular velocity $\omega_z'$ in a period of 0.003 s from impact. Also, the value of angular velocity $\omega_x'$ that is shown in the graphs is the maximum value (peak amplitude) of $\omega_x'$ in a period of 0.003 s from impact.

It is evident from this diagram that the magnitudes of angular velocities $\omega_x'$ and $\omega_z'$ increase as the head speed increases, even at the same impact point. Accordingly, it was evident that estimation of impact points $D_{th}$ and $D_{ts}$ is possible with higher accuracy if the head speed is known. This was also supported by the following simulation results.

That is, the inventors performed multiple regression analysis, based on the simulation data of angular velocities $\omega_x'$ and $\omega_z'$ at the following 25 impact points ($D_{th}$, $D_{ts}$) when the head speed was set to 40 m/s. The simulation values of angular velocities $\omega_x'$ and $\omega_z'$ were substituted into the obtained multiple regression equation, and the impact points ($D_{th}$, $D_{ts}$) were calculated. Furthermore, the difference of impact points $D_{th}$ and $D_{ts}$ calculated from the multiple regression equation and the true impact points $D_{th}$ and $D_{ts}$ was computed. The results are shown in the following table 1. From the following table it is evident that there is only a slight error between impact points $D_{th}$ and $D_{ts}$ calculated from the multiple regression equation and the true impact points $D_{th}$ and $D_{ts}$. Note that $D_{th}$ and $D_{ts}$ in the following table are in units of millimeters.

TABLE 1

| True value | | | | Calculated by multiple regression equation | | Difference | |
|---|---|---|---|---|---|---|---|
| $D_{th}$ | $D_{ts}$ | $\omega_x'$ | $\omega_z'$ | $D_{th}$ | $D_{ts}$ | $D_{th}$ | $D_{ts}$ |
| −20 | 10 | 37.39 | −236.54 | −20.08 | 9.53 | 0.08 | 0.47 |
| −20 | 5 | 25.449 | −198.98 | −19.93 | 4.94 | −0.07 | 0.06 |
| −20 | 0 | 13.187 | −160.25 | −19.77 | 0.21 | −0.23 | −0.21 |
| −20 | −5 | 0 | −120.53 | −19.73 | −4.77 | −0.27 | −0.23 |
| −20 | −10 | 0 | −80.993 | −16.89 | −6.83 | −3.11 | −3.17 |
| −10 | 10 | 56.885 | −159.61 | −10.38 | 9.86 | 0.38 | 0.14 |
| −10 | 5 | 44.82 | −120.34 | −10.13 | 5.14 | 0.13 | −0.14 |
| −10 | 0 | 31.613 | −80.428 | −10.09 | 0.14 | 0.09 | −0.14 |
| −10 | −5 | 18.457 | −40.127 | −10.00 | −4.86 | 0.00 | −0.14 |
| −10 | −10 | 0 | 0 | −11.06 | −11.04 | 1.06 | 1.04 |
| 0 | 10 | 77.083 | −79.351 | −0.28 | 10.16 | 0.28 | −0.16 |
| 0 | 5 | 64.804 | −39.395 | −0.04 | 5.36 | 0.04 | −0.36 |
| 0 | 0 | 50.893 | 0 | −0.18 | 0.24 | 0.18 | −0.24 |
| 0 | −5 | 37.669 | 44.701 | 0.21 | −5.01 | −0.21 | 0.01 |
| 0 | −10 | 23.139 | 83.052 | −0.14 | −10.23 | 0.14 | 0.23 |
| 10 | 10 | 96.383 | 0 | 9.55 | 10.31 | 0.45 | −0.31 |
| 10 | 5 | 84.529 | 49.946 | 10.61 | 5.09 | −0.61 | −0.09 |
| 10 | 0 | 70.635 | 87.702 | 10.35 | 0.05 | −0.35 | −0.05 |
| 10 | −5 | 57.027 | 126.93 | 10.26 | −5.00 | −0.26 | 0.00 |
| 10 | −10 | 42.215 | 164.79 | 9.82 | −10.25 | 0.18 | 0.25 |
| 20 | 10 | 113.97 | 89.662 | 19.76 | 9.55 | 0.24 | 0.45 |
| 20 | 5 | 102.85 | 127.44 | 20.10 | 5.12 | −0.10 | −0.12 |
| 20 | 0 | 90.448 | 167.31 | 20.32 | 0.31 | −0.32 | −0.31 |
| 20 | −5 | 75.404 | 205.67 | 19.86 | −5.02 | 0.14 | 0.02 |
| 20 | −10 | 61.014 | 242.57 | 19.43 | −10.12 | 0.57 | 0.12 |

Similarly, the inventors calculated the values of angular velocities $\omega_x{'}$ and $\omega_z{'}$ at 25 impact points ($D_{th}$, $D_{ts}$) when the head speed was set to 35 m/s by simulation. In order to verify the influence of head speed, the values of angular velocities $\omega_x{'}$ and $\omega_z{'}$ at a head speed of 35 m/s were then normalized to values assuming a head speed of 40 m/s. Specifically, values obtained by multiplying angular velocities $\omega_x{'}$ and $\omega_z{'}$ at a head speed of 35 m/s by 40/35 were taken as normalized angular velocities $\omega_x{'}$ and $\omega_z{'}$. The normalized angular velocities $\omega_x{'}$ and $\omega_z{'}$ were then substituted into a multiple regression equation for a head speed of 40 m/s, and impact points $D_{th}$ and $D_{ts}$ were calculated. Furthermore, the difference of impact points $D_{th}$ and $D_{ts}$ calculated from the multiple regression equation and the true impact points $D_{th}$ and $D_{ts}$ was computed. The results are shown in the following table 2. It is evident from the following table that there is only a slight error of around 3 mm at maximum between impact points $D_{th}$ and $D_{ts}$ calculated from the multiple regression equation and the true impact points $D_{th}$ and $D_{ts}$. Note that $D_{th}$ and $D_{ts}$ in the following table are in units of millimeters.

TABLE 2

| True value | | | | Calculated by multiple regression equation | | Difference | |
|---|---|---|---|---|---|---|---|
| $D_{th}$ | $D_{ts}$ | $\omega_x{'}$ | $\omega_z{'}$ | $D_{th}$ | $D_{ts}$ | $D_{th}$ | $D_{ts}$ |
| −20 | 10 | 32.469 | −207.03 | −20.14 | 9.48 | 0.14 | 0.52 |
| −20 | 5 | 22.084 | −173.99 | −19.97 | 4.89 | −0.03 | 0.11 |
| −20 | 0 | 11.336 | −140.01 | −19.80 | 0.15 | −0.20 | −0.15 |
| −20 | −5 | 0 | −105.17 | −19.71 | −4.79 | −0.29 | −0.21 |
| −20 | −10 | 0 | −70.45 | −16.85 | −6.85 | −3.15 | −3.15 |
| −10 | 10 | 49.129 | −139.55 | −10.52 | 9.69 | 0.52 | 0.31 |
| −10 | 5 | 38.698 | −105.01 | −10.24 | 5.00 | 0.24 | 0.00 |
| −10 | 0 | 27.098 | −69.631 | −10.16 | −0.04 | 0.16 | 0.04 |
| −10 | −5 | 15.456 | −34.167 | −10.09 | −5.09 | 0.09 | 0.09 |
| −10 | −10 | 0 | 0 | −11.06 | −11.04 | 1.06 | 1.04 |
| 0 | 10 | 66.115 | −69.265 | −0.60 | 9.81 | 0.60 | 0.19 |
| 0 | 5 | 55.719 | −33.9 | −0.23 | 5.08 | 0.23 | −0.08 |
| 0 | 0 | 43.766 | 0 | −0.36 | 0.04 | 0.36 | −0.04 |
| 0 | −5 | 31.743 | 40.16 | 0.00 | −5.38 | 0.00 | 0.38 |
| 0 | −10 | 19.45 | 74.02 | −0.22 | −10.51 | 0.22 | 0.51 |
| 10 | 10 | 82.527 | 0 | 9.11 | 9.85 | 0.89 | 0.15 |
| 10 | 5 | 72.372 | 44.363 | 10.27 | 4.65 | −0.27 | 0.35 |
| 10 | 0 | 60.897 | 77.993 | 10.23 | −0.25 | −0.23 | 0.25 |
| 10 | −5 | 48.178 | 112.56 | 9.97 | −5.52 | 0.03 | 0.52 |
| 10 | −10 | 35.715 | 146.03 | 9.67 | −10.67 | 0.33 | 0.67 |
| 20 | 10 | 97.688 | 77.763 | 19.21 | 9.08 | 0.79 | 0.92 |
| 20 | 5 | 87.948 | 113.2 | 19.74 | 4.51 | 0.26 | 0.49 |
| 20 | 0 | 77.019 | 148.35 | 19.96 | −0.35 | 0.04 | 0.35 |
| 20 | −5 | 63.763 | 182.22 | 19.50 | −5.71 | 0.50 | 0.71 |
| 20 | −10 | 51.758 | 214.8 | 19.24 | −10.69 | 0.76 | 0.69 |

Similarly to the simulation of table 2, the inventors calculated the values of angular velocities $\omega_x{'}$ and $\omega_z{'}$ at 25 impact points ($D_{th}$, $D_{ts}$) when the head speed was set to 45 m/s by simulation. In order to verify the influence of head speed, the values of angular velocities $\omega_x{'}$ and $\omega_z{'}$ at a head speed of 45 m/s were then normalized to values assuming a head speed of 40 m/s. Specifically, values obtained by multiplying angular velocities $\omega_x{'}$ and $\omega_z{'}$ at a head speed of 45 m/s by 40/45 were taken as normalized angular velocities $\omega_x{'}$ and $\omega_z{'}$. The normalized angular velocities $\omega_x{'}$ and $\omega_z{'}$ were then substituted into a multiple regression equation for a head speed of 40 m/s, and impact points $D_{th}$ and $D_{ts}$ were calculated. Furthermore, the difference of impact points $D_{th}$ and $D_{ts}$ calculated from the multiple regression equation and the true impact points $D_{th}$ and $D_{ts}$ was computed. The results are shown in the following table 3. It is evident from the following table that there is also only a slight error of around 3 mm at maximum between impact points $D_{th}$ and $D_{ts}$ calculated from the multiple regression equation and the true impact points $D_{th}$ and $D_{ts}$ when the head speed is 45 m/s. Note that $D_{th}$ and $D_{ts}$ in the following table are in units of millimeters.

TABLE 3

| True value | | | | Calculated by multiple regression equation | | Difference | |
|---|---|---|---|---|---|---|---|
| $D_{th}$ | $D_{ts}$ | $\omega_x{'}$ | $\omega_z{'}$ | $D_{th}$ | $D_{ts}$ | $D_{th}$ | $D_{ts}$ |
| −20 | 10 | 42.408 | −265.11 | −19.95 | 9.56 | −0.05 | 0.44 |
| −20 | 5 | 29.399 | −222.95 | −19.73 | 5.05 | −0.27 | −0.05 |
| −20 | 0 | 15.127 | −179.49 | −19.66 | 0.23 | −0.34 | −0.23 |
| −20 | −5 | 0 | −135.12 | −19.70 | −4.80 | −0.30 | −0.20 |
| −20 | −10 | 0 | −90.915 | −16.87 | −6.84 | −3.13 | −3.16 |
| −10 | 10 | 64.127 | −179.43 | −10.34 | 9.88 | 0.34 | 0.12 |
| −10 | 5 | 50.57 | −135.46 | −10.11 | 5.18 | 0.11 | −0.18 |
| −10 | 0 | 36.61 | −90.621 | −9.90 | 0.36 | −0.10 | −0.36 |
| −10 | −5 | 21.342 | −45.306 | −9.90 | −4.74 | −0.10 | −0.26 |
| −10 | −10 | 0 | 0 | −11.06 | −11.04 | 1.06 | 1.04 |
| 0 | 10 | 87.259 | −90.253 | −0.24 | 10.31 | 0.24 | −0.31 |
| 0 | 5 | 73.339 | −45.273 | −0.01 | 5.49 | 0.01 | −0.49 |
| 0 | 0 | 58.962 | 0 | 0.15 | 0.57 | −0.15 | −0.57 |
| 0 | −5 | 43.428 | 49.088 | 0.33 | −4.75 | −0.33 | −0.25 |
| 0 | −10 | 26.664 | 91.926 | −0.12 | −10.03 | 0.12 | 0.03 |
| 10 | 10 | 109.32 | 0 | 9.72 | 10.49 | 0.28 | −0.49 |
| 10 | 5 | 95.807 | 54.971 | 10.67 | 5.29 | −0.67 | −0.29 |
| 10 | 0 | 80.437 | 97.565 | 10.47 | 0.30 | −0.47 | −0.30 |
| 10 | −5 | 65.748 | 141 | 10.45 | −4.60 | −0.45 | −0.40 |
| 10 | −10 | 48.508 | 183.16 | 9.87 | −9.94 | 0.13 | −0.06 |
| 20 | 10 | 129.4 | 97.265 | 19.76 | 9.95 | 0.24 | 0.05 |
| 20 | 5 | 116.8 | 141.35 | 20.18 | 5.43 | −0.18 | −0.43 |
| 20 | 0 | 102.93 | 185.95 | 20.39 | 0.64 | −0.39 | −0.64 |
| 20 | −5 | 87.099 | 228.95 | 20.13 | −4.46 | −0.13 | −0.54 |
| 20 | −10 | 70.064 | 269.84 | 19.51 | −9.70 | 0.49 | −0.30 |

2-2-2. Details of Processing

Next, the impact point estimation processing of FIG. 5 will be described in detail. The impact point estimation processing starts when the data collection processing has ended, the sensor data has been stored in the storage unit 23, and execution of the impact point estimation processing has been instructed by a user. In the initial step S1, the characteristic value calculation unit 24B derives times $t_i$, $t_t$ and $t_a$ of impact, top and address, based on the sensor data stored in the storage unit 23. In the present embodiment, time $t_i$ of impact is derived first, time $t_t$ of top is derived based on time $t_i$ of impact, and time $t_a$ of address is derived based on time $t_t$ of top.

Specifically, the time at which the increment in angular velocity $\omega_x$ per predetermined period $T_1$ initially exceeds a predetermined threshold value $D_1$ is set as a provisional time of impact. The time at which the increment in angular velocity $\omega_x$ per period $T_1$ exceeds a predetermined threshold value $D_2$ ($D_2<D_1$) during a period up to this provisional time of impact from a predetermined period of time prior to the provisional time of impact is detected and set as time $t_i$ of impact.

Figure 10:
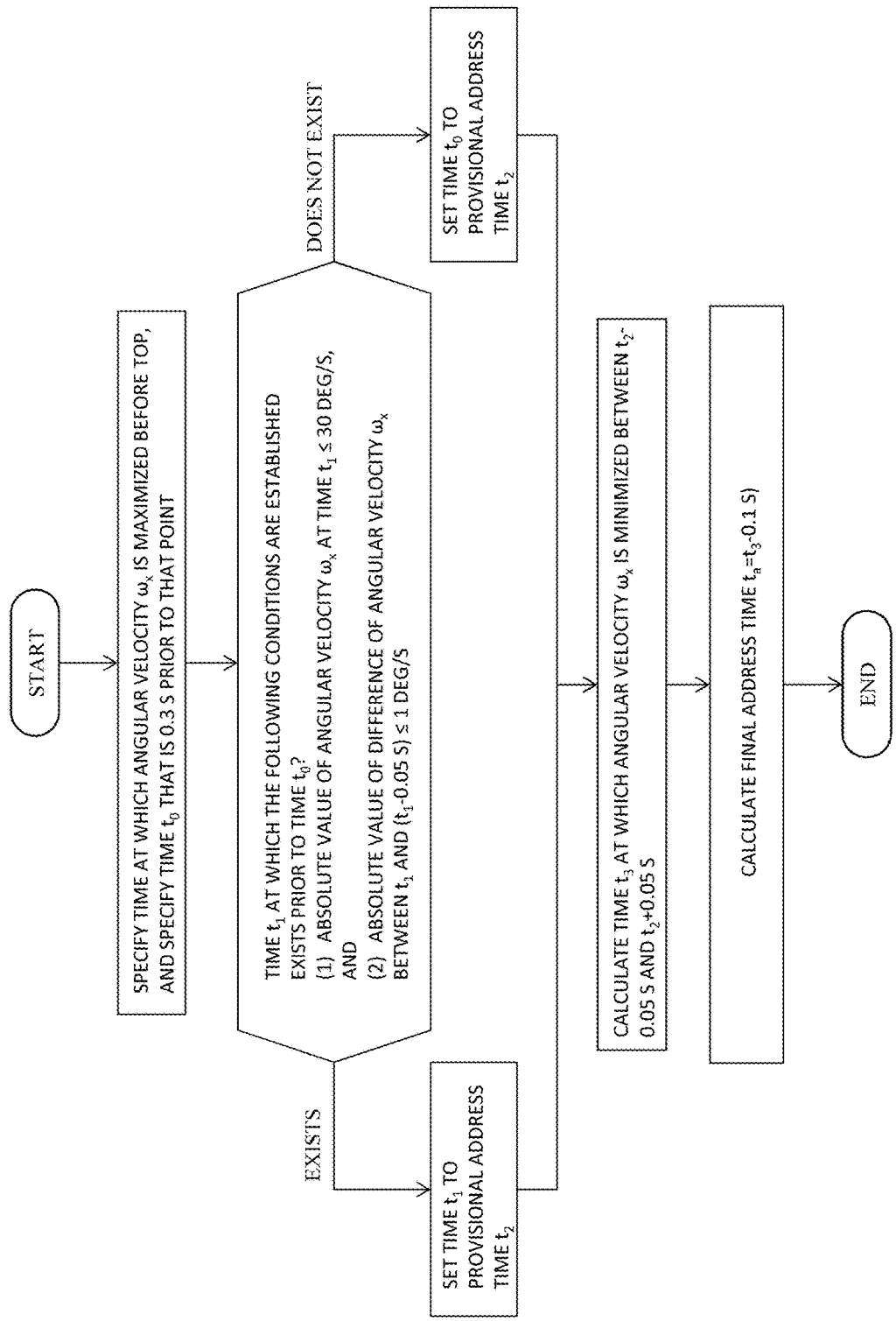
FIG. 10 is a flowchart showing the flow of processing for deriving a time of address.

Next, the time, prior to time $t_i$ of impact, at which angular velocity $\omega_y$ switches from negative to positive is specified as time $t_t$ of top. Also, time $t_a$ of address is calculated in accordance with the flowchart of FIG. 10. Note that various algorithms for calculating times $t_i$, $t_t$ and $t_a$ of impact, top and address are known, and that the algorithm described here is merely illustrative.

In the following step S2, the characteristic value calculation unit 24B derives time series data (hereinafter, analytical data) of angular velocities $\omega_x$ and $\omega_z$ in an analysis period from the sensor data that are stored in the storage unit 23. The analysis period as referred to here is a period including the initial period after impact, and, in the present embodiment, is a period from time $t_i$ of impact to (time $t_i$ of impact+T). Note that preferably 0 s<T≤0.01 s, more preferably 0 s<T≤0.005 s, and still more preferably 0 s<T≤0.003 s. Only a first wave of the stress wave that occurs due to impact, or up to around the third wave at most, appears in such an analysis period. That is, the angular velocity data of the analysis period will be data representing the characteristics of the stress wave prior to interference occurring between a large number of the waves. Note that the time of commencement of the analysis period need not be time $t_i$ of impact, and (time $t_i$ of impact+$T_0$) to (time $t_i$ of impact+T) can be taken as the analysis period, for example, where 0<$T_0$<T. The analysis period can also be set such that only a period after time $t_i$ of impact is included, or can also be set such that a period prior to time $t_i$ of impact is included. Note that in the sensor data obtained when a club is actually swung, the data of angular velocities $\omega_x'$ and $\omega_z'$ of the stress wave caused by impact are superimposed on the data of the angular velocities resulting from the swing from address to finish. Accordingly, in deriving the analytical data, it is preferable to extract the data of the stress wave, which is a high frequency component, in advance by processing such as applying a high-pass filter to the sensor data. The characteristics of angular velocities $\omega_x'$ and $\omega_z'$ of the stress wave caused by impact can thereby be evaluated with higher accuracy. It is, however, also possible to evaluate the characteristics of angular velocities $\omega_x'$ and $\omega_z'$ of the stress wave caused by impact by directly evaluating $\omega_x$ and $\omega_z$. In this sense, hereinafter, the data of angular velocities $\omega_x$ and $\omega_z$ after high-pass filtering is also represented using $\omega_x$ and $\omega_z$ rather than $\omega_x'$ and $\omega_z'$.

In the following step S3, the characteristic value calculation unit 24B calculates a characteristic value $C_1$, based on the analytical data derived at step S2. The characteristic value $C_1$ is an index that is dependent on the impact point, and is a value representing the characteristics of the initial stress wave that occurs due to impact, and, in the present embodiment, is the maximum value or minimum value (peak amplitude) of angular velocity $\omega_z$ in the analysis period.

Similarly, in the following step S4, the characteristic value calculation unit 24B calculates a characteristic value $C_2$, based on the analytical data derived at step S2. The characteristic value $C_2$ is an index that is dependent on the impact point, and is a value representing the characteristics of the initial stress wave that occurs due to impact, and, in the present embodiment, is the maximum value or minimum value (peak amplitude) of angular velocity $\omega_x$ in the analysis period.

In the following step S5, the impact point estimation unit 24C corrects characteristic values $C_1$ and $C_2$ calculated at steps S3 and S4, according to head speed $V_h$ at impact. This correction is processing for respectively calculating, from characteristic values $C_1$ and $C_2$, characteristic values $C_1'$ and $C_2'$ in which the influence of the magnitude of head speed $V_h$ has been canceled. That is, in step S5, characteristic values $C_1$ and $C_2$ are converted into characteristic values $C_1'$ and $C_2'$ which would be obtained in the case where head speed $V_r$ serving as a reference were exhibited. In the present embodiment, characteristic values $C_1'$ and $C_2'$ are calculated, in accordance with the following equations. Note that various algorithms for calculating head speed $V_h$ are known, and, in the present embodiment, an algorithm which will be discussed later is used.

$$C_1' = (V_r/V_h)C_1$$

$$C_2' = (V_r/V_h)C_2$$

In the following step S6, the impact point estimation unit 24C estimates impact point $D_{th}$ of the ball on the face surface 41a in toe-heel direction, according to the corrected characteristic values $C_1'$ and $C_2'$. More specifically, in the present embodiment, impact point $D_{th}$ is calculated, in accordance with the following equation in which impact point $D_{th}$ is the objective variable and characteristic values $C_1'$ and $C_2'$ are explanatory variables.

$$D_{th} = k_{th0} + k_{th1} \cdot C_1' + k_{th2} \cdot C_2'$$

Here, $k_{th0}$, $k_{th1}$ and $k_{th2}$ are constants, and are the above-mentioned coefficient data 28. As described above, according to the simulation performed by the inventors, impact point $D_{th}$ is correlated with characteristic values $C_1'$ and $C_2'$. Accordingly, $k_{th0}$, $k_{th1}$, and $k_{th2}$ can be set in advance, by performing multiple regression analysis on a large number of data sets ($D_{th}$, $C_1'$, $C_2'$) that are obtained through simulation or testing.

Similarly, in the following step S7, the impact point estimation unit 24C estimates impact point $D_{ts}$ of the ball on the face surface 41a in the top-sole direction, according to the corrected characteristic values $C_1'$ and $C_2'$. More specifically, in the present embodiment, impact point $D_{ts}$ is calculated, in accordance with the following equation in which impact point $D_{ts}$ is the objective variable and characteristic values $C_1'$ and $C_2'$ are explanatory variables.

$$D_{ts} = k_{ts0} + k_{ts1} \cdot C_1' + k_{ts2} \cdot C_2'$$

Here, $k_{ts0}$, $k_{ts1}$ and $k_{ts2}$ are constants, and are the above-mentioned coefficient data 28. As described above, according to the simulation performed by the inventors, impact point $D_{ts}$ is also correlated with characteristic values $C_1'$ and $C_2'$. Accordingly, $k_{ts0}$, $k_{ts1}$ and $k_{ts2}$ can be set in advance, by preparing a large number of data sets ($D_{ts}$, $C_1'$, $C_2'$) through simulation or testing, and performing multiple regression analysis on these data sets.

In the following step S8, the display control unit 24G displays information about impact points $D_{th}$ and $D_{ts}$ calculated at steps S6 and S7 on the display unit 21. The user is thereby able to clearly grasp the position of the impact points at the time of his or her own swing. The impact point estimation processing ends when step S8 has ended.

2-2-3. Head Speed Calculation Processing

Hereinafter, processing for calculating head speed $V_h$ will be described. However, the calculation algorithm that is described here is an example, and can be substituted with various known algorithms.

First, the time series sensor data relating to accelerations $a_x$, $a_y$ and $a_z$ in the xyz local coordinate system that are stored in the storage unit 23 are converted into values in an XYZ global coordinate system. Note that the XYZ global coordinate system is a 3-axis orthogonal coordinate system that is defined as shown in FIG. 1. That is, the Z-axis is a direction pointing vertically upward from below, the X-axis is a direction pointing toward the stomach of the golfer 7 from his or her back, and the Y-axis is a direction parallel to the horizontal plane and pointing toward a target point from a ball hitting point.

Specifically, an attitude matrix N(t) at an each time t at or after address is calculated. Here, the attitude matrix is represented with the following equation. The attitude matrix N(t) is a matrix for converting the XYZ global coordinate system into the xyz local coordinate system at time t.

$$N(t) = \begin{pmatrix} a & b & c \\ d & e & f \\ g & h & i \end{pmatrix}^T \qquad \text{Equation 1}$$

The meaning of the nine components of the attitude matrix N(t) is as follows.

Component a: Cosine of the angle formed by the X-axis of the global coordinate system and the x-axis of the local coordinate system Component b: Cosine of the angle formed by the Y-axis of the global coordinate system and the x-axis of the local coordinate system Component c: Cosine of the angle formed by the Z-axis of the global coordinate system and the x-axis of the local coordinate system Component d: Cosine of the angle formed by the X-axis of the global coordinate system and the y-axis of the local coordinate system Component e: Cosine of the angle formed by the Y-axis of the global coordinate system and the y-axis of the local coordinate system Component f: Cosine of the angle formed by the Z-axis of the global coordinate system and the y-axis of the local coordinate system Component g: Cosine of the angle formed by the X-axis of the global coordinate system and the z-axis of the local coordinate system Component h: Cosine of the angle formed by the Y-axis of the global coordinate system and the z-axis of the local coordinate system Component i: Cosine of the angle formed by the Z-axis of the global coordinate system and the z-axis of the local coordinate system Here, a vector (a, b, c) represents a unit vector in the x-axis direction, a vector (d, e, f) represents a unit vector in the y-axis direction, and a vector (g, h, i) represents a unit vector in the z-axis direction.

Also, the attitude matrix N(t) can be represented with the following equation, in accordance with the thinking of Euler angles in ZYZ convention, where $\varphi$, $\theta$ and $\psi$ are the rotation angles about the Z-axis, the Y-axis and the Z-axis.

$$N(t) = \begin{bmatrix} \cos\phi\cos\theta\cos\varphi - \sin\phi\sin\varphi & -\cos\phi\cos\theta\sin\varphi - \sin\phi\cos\varphi & \cos\phi\sin\theta \\ \sin\phi\cos\theta\cos\varphi + \cos\phi\sin\varphi & -\sin\phi\cos\theta\sin\varphi + \cos\phi\cos\varphi & \sin\phi\sin\theta \\ -\sin\theta\cos\varphi & \sin\theta\sin\varphi & \cos\theta \end{bmatrix} \qquad \text{Equation 2}$$

In calculating the attitude matrix N(t) at and after address, first an attitude matrix $N(t_a)$ at time $t_a$ of address is calculated. Specifically, $\varphi$ and $\theta$ at address are calculated, in accordance with the following equation. Note that, in the following equation, the fact that the golf club 4 is stationary at address, and only gravity in the vertical direction is detected by the acceleration sensor 11 is utilized. Accelerations $a_x$, $a_y$ and $a_z$ in the following equations are values at address.

$$\phi = \tan^{-1}\left(\frac{a_y}{a_x}\right) \qquad \text{Equation 3}$$

$$\theta = \tan^{-1}\left(\frac{\sqrt{a_x^2 + a_y^2}}{a_z}\right) \qquad \text{Equation 4}$$

Then, $\psi$ at address is calculated, in accordance with the following equation.

$$\varphi = \tan^{-1}\left(\frac{-m_{yi}}{m_{xi}}\right) \qquad \text{Equation 5}$$

The values of $m_{xi}$ and $m_{yi}$ in the above equation are calculated in accordance with the following equation. Also, geomagnetisms $m_x$, $m_y$ and $m_z$ in the following equation are values at address.

$$\begin{bmatrix} m_{xi} \\ m_{yi} \\ m_{zi} \end{bmatrix} = \begin{bmatrix} \cos\theta\cos\phi & -\cos\theta\sin\phi & \sin\theta \\ \sin\phi & \cos\phi & 0 \\ -\sin\theta\cos\phi & \sin\theta\sin\phi & \cos\theta \end{bmatrix} \begin{bmatrix} m_x \\ m_y \\ m_z \end{bmatrix} \qquad \text{Equation 6}$$

From the above, $\varphi$, $\theta$ and $\varphi$ at address are calculated based on accelerations $a_x$, $a_y$ and $a_z$ and geomagnetisms $m_x$, $m_y$ and $m_z$ in the xyz local coordinate system. The attitude matrix $N(t_a)$ at address is then calculated, by substituting these values of $\varphi$, $\theta$ and $\psi$ into equation 2.

Next, the attitude matrix N(t) after address is calculated, by updating the attitude matrix $N(t_a)$ at address every interval of the sampling period $\Delta t$. To be more specific, first, the attitude matrix N(t) is represented with the following equation, using four quaternion variables $q_1$, $q_2$, $q_3$ and $q_4$ ($q_4$ is a scalar part).

$$N(t) = \begin{pmatrix} q_1^2 - q_2^2 - q_3^2 + q_4^2 & 2(q_3q_4 + q_1q_2) & 2(q_1q_3 - q_2q_4) \\ 2(q_1q_2 - q_3q_4) & -q_1^2 + q_2^2 - q_3^2 + q_4^2 & 2(q_1q_4 + q_2q_3) \\ 2(q_2q_4 + q_1q_3) & 2(q_2q_3 - q_1q_4) & -q_1^2 - q_2^2 + q_3^2 + q_4^2 \end{pmatrix} \qquad \text{Equation 7}$$

Accordingly, the four quaternion variables $q_1$, $q_2$, $q_3$ and $q_4$ can be calculated from the following equation, in accordance with equation 1 and equation 7.

$q_4 = \pm \frac{1}{2}\sqrt{1+a+e+i}$ $q_1 = (h-f)/4q_4$ $q_2 = (c-g)/4q_4$ $q_3 = (d-b)/4q_4$ \qquad Equation 8

Here, the values of components a through i defining the attitude matrix $N(t_a)$ at address are known. Therefore, in accordance with the above equation, the four quaternion variables $q_1$, $q_2$, $q_3$ and $q_4$ at address are calculated.

Quaternion q' at a short time after time t is represented with the following equation using quaternion q at time t.

$$q' = qdq \quad \text{Equation 9}$$

$$dq = \int \frac{d}{dt} q \, dt$$

Also, a first-order differential equation representing the change in time of the four quaternion variables $q_1$, $q_2$, $q_3$ and $q_4$ is represented with the following equation.

$$\frac{d}{dt}\begin{pmatrix} q_1 \\ q_2 \\ q_3 \\ q_4 \end{pmatrix} = \frac{1}{2}\begin{pmatrix} 0 & \omega_z & -\omega_y & \omega_x \\ -\omega_z & 0 & \omega_x & \omega_y \\ \omega_y & -\omega_x & 0 & \omega_z \\ -\omega_x & -\omega_y & -\omega_z & 0 \end{pmatrix}\begin{pmatrix} q_1 \\ q_2 \\ q_3 \\ q_4 \end{pmatrix} \quad \text{Equation 10}$$

The quaternion at time t can be sequentially updated to the quaternion at the next time t+Δt by using equations 9 and 10. Here, the quaternion after address is calculated. The attitude matrix N(t) after address is then calculated, by sequentially substituting the four quaternion variables $q_1$, $q_2$, $q_3$ and $q_4$ after address into equation 7.

Then, based on the attitude matrix N(t) at and after address, the time series data of accelerations $a_x$, $a_y$ and $a_z$ in the xyz local coordinate system are converted into time series data in the XYZ global coordinate system. The converted accelerations $a_X$, $a_Y$ and $a_Z$ are calculated in accordance with the following equation.

$$(a_X a_Y a_Z)^T = [N(t)]^T (a_x a_y a_z)^T \quad \text{Equation 11}$$

Next, the time series data of speeds $v_X$, $v_Y$ and $v_Z$ in the XYZ global coordinate system at and after address are derived, by integrating the time series data of accelerations $a_X$, $a_Y$ and $a_Z$. At this time, offset is preferably applied to speeds $v_X$, $v_Y$ and $v_Z$ from address to impact, such that these speeds will be 0 m/s at top. For example, offset at an arbitrary time t is applied by subtracting (speeds $v_X$, $v_Y$ and $v_Z$ at time $t_t$ of top)*t/($t_t - t_a$) from speeds $v_X$, $v_Y$ and $v_Z$ at time t.

Also, the time series data of position coordinates (X(t), Y(t) and Z(t)) of the sensor unit 1 in the XYZ global coordinate system at and after address are derived, by integrating the time series data of speeds $v_X$, $v_Y$ and $v_Z$.

Then, the position coordinates ($X_h(t)$, $Y_h(t)$ and $Z_h(t)$) of the head 41 in the XYZ global coordinate system at and after address are calculated. Specifically, the position coordinates ($X_h(t)$, $Y_h(t)$ and $Z_h(t)$) are calculated in accordance with the following equation, using the attitude matrix N(t). Note that L is the distance from the sensor unit 1 to the head 41, and (0, 0, L) represents the position of the head 41 in the xyz local coordinate system.

$$(X_h(t) Y_h(t) Z_h(t))^T = [N(t)]^T (0\ 0\ L)^T \quad \text{Equation 12}$$

Then, in accordance with the following equation, the position coordinates ($X_h(t)$, $Y_h(t)$ and $Z_h(t)$) of the head 41 are corrected by being moved parallelly by an amount of the position coordinates (X(t), Y(t) and Z(t)) of the sensor unit 1.

Hereinafter, the corrected position coordinates of the head 41 are also represented as ($X_h(t)$, $Y_h(t)$, $Z_h(t)$).

$$(X_h(t), Y_h(t), Z_h(t)) = (X(t), Y(t), Z(t)) + (X_h(t), Y_h(t), Z_h(t)) \quad \text{Equation 13}$$

Next, speed vectors ($v_h(t)$, $v_h(t)$ and $v_h(t)$) of the head 41 can be calculated, by differentiating the components of the position coordinates ($X_h(t)$, $Y_h(t)$ and $Z_h(t)$) of the head 41. Head speed $V_h$ at impact is calculated as the magnitude of the speed vectors ($v_h(t_i)$, $v_h(t_i)$, $v_h(t_i)$).

3. Variations

Although one embodiment of the present invention has been described above, the present invention is not limited to the foregoing embodiment, and various modifications that do not depart from the spirit of the invention can be made. For example, the following modifications can be made. Also, the features of the following variations can be combined as appropriate.

3-1

In the above embodiment, a sensor unit 1 that has three sensors consisting of the acceleration sensor 11, the angular velocity sensor 12 and the geomagnetic sensor 13 was used, but at least one of the geomagnetic sensor 13 and the acceleration sensor 11 can also be omitted.

Figure 11:
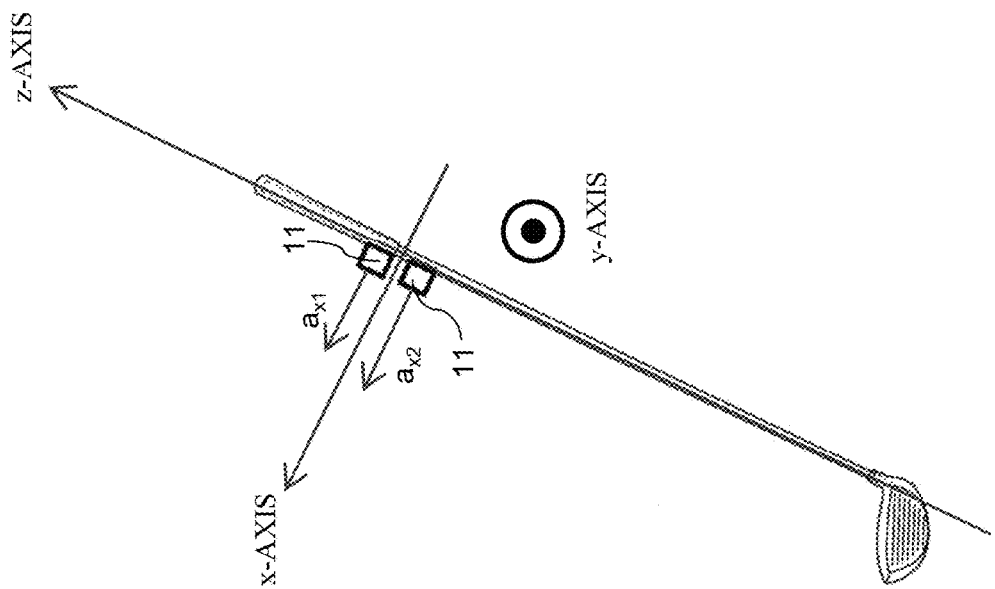
FIG. 11 is a diagram showing disposition of a sensor unit according to a variation.

Also, a plurality of acceleration sensors 11 may be mounted in the sensor unit 1. In this case, angular acceleration can be acquired from the difference of the output values of a pair of acceleration sensors 11. For example, as shown in FIG. 11, two acceleration sensors are attached at a distance from each other in the z-axis direction, and acceleration in the x-axis direction is measured at two places. The difference of these two accelerations (given as $a_{x1}$ and $a_{x2}$) will be a value (dependent on the distance between the acceleration sensors 11) proportional to the angular acceleration about a y-axis whose center of rotation is the center of the two sensors 11. Similarly, the angular acceleration about the z-axis can be specified by disposing an acceleration sensor on each side of the z-axis, measuring two accelerations in a direction perpendicular to the z-axis, and obtaining the difference thereof. Also, the angular acceleration about the x-axis can be specified by disposing an acceleration sensor on each side of the x-axis, measuring two accelerations in a direction perpendicular to the x-axis, and obtaining the difference thereof. Angular acceleration is considered to have a linear relationship with the impact point, similarly to angular velocity, and thus can be used as a characteristic value for impact point estimation. That is, in this case, the angular velocity sensor 12 can also be omitted.

3-2

The method of calculating head speed $V_h$ is not limited to the abovementioned example, and it is also not necessary to use the abovementioned sensor data. For example, systems such as a radar (radio wave type) system that emits and measures specific radio waves, a phototube system that performs measurement using laser light, or an image processing system that obtains images of the swing motion captured by a camera can be employed. In each case, a respectively required measurement device need only be provided.

3-3

In the above embodiment, the sensor unit 1 was attached to the shaft 40 in a vicinity of the grip 42, but may be attached to the grip 42, or may be attached to an intermediate portion of the shaft 40 or to a vicinity of the head 41. From the viewpoint of suppressing the influence on the golf swing caused by the presence of the sensor unit 1, however, it is preferable to attach the sensor unit 1 to a position that is a sufficient distance from the head 41.

3-4

In the above embodiment, impact point estimation was performed using the data of angular velocities $\omega_x$ and $\omega_z$ out of the sensor data, but various indices that are dependent on the impact point can be used in impact point estimation. For example, the data of angular velocity $\omega_y$ can also be used, and the data of accelerations $a_x$, $a_y$ and $a_z$ can also be used. Also, impact point estimation based on sensor data is not limited to multiple regression analysis, and simple regression analysis can also be performed depending on the indices that are explanatory variables. Furthermore, a non-linear regression equation may be used. Also, impact point estimation is not limited to regression analysis, and can be performed from sensor data, using an algorithm such as a machine learning algorithm or a neural network algorithm. Also, rather than the amplitude values themselves, amplitude-dependent values, such as integral values in the analysis period, can be used as characteristic values $C_1$ and $C_2$. 3-5

Time $t_i$ of impact can also be specified based on the output values of another measurement device, rather than being specified based on the output values of the sensor unit 1 as described above. For example, a vibration sensor can be attached to the golf ball 43, and time $t_i$ of impact can be specified from the output values of this vibration sensor. Also, a camera can be installed, the swing motion can be captured with the camera, and time $t_i$ of impact can be specified based on the captured image.

REFERENCE SIGNS LIST

1 Sensor unit
12 Angular velocity sensor
2 Analysis apparatus (impact point estimation apparatus, computer)
3 Analysis program (impact point estimation program)
4 Golf club
24A Data acquisition unit (acquisition unit)
24B Characteristic value calculation unit (calculation unit)
24C Impact point estimation unit (estimation unit)
40 Shaft
41 Head
41 Face surface
42 Grip
43 Golf ball

The invention claimed is:

1. An impact point estimation apparatus for estimating an impact point on a face surface of a head when a golf club having a grip, a shaft and the head is swung and hits a golf ball, comprising:
an acquisition unit configured to acquire time series sensor data that is output from at least one of an angular velocity sensor and an acceleration sensor that is attached to at least one of the grip and the shaft;
a calculation unit configured to calculate a characteristic value of an initial stress wave that occurs due to impact, based on the sensor data acquired in an analysis period including an initial period after impact; and
an estimation unit configured to estimate the impact point on the face surface, according to the characteristic value, wherein the analysis period includes only a period after impact and before 0.005 seconds have elapsed from impact, and wherein the characteristic value includes a first characteristic value of an angular velocity about a first axis and a second characteristic value of an angular velocity about a second axis as characteristic values of the initial stress wave that occurs due to impact, and the first and second characteristic values are determined based on the sensor data acquired in the analysis period, the first axis and the second axis being included in a plane that is generally parallel to the face surface and being substantially orthogonal with each other.

2. The impact point estimation apparatus according to claim 1, wherein the characteristic value is a characteristic value of a first wave of the stress wave that occurs due to impact.

3. The impact point estimation apparatus according to claim 2, wherein the characteristic value includes an amplitude of angular velocity data acquired in the analysis period or a value that depends on the amplitude.

4. The impact point estimation apparatus according to claim 2, wherein the estimation unit is configured to estimate the impact point, according to a head speed when the golf club is swung, in addition to the characteristic value.

5. The impact point estimation apparatus according to claim 1, wherein the characteristic value includes an amplitude of angular velocity data acquired in the analysis period or a value that depends on the amplitude.

6. The impact point estimation apparatus according to claim 1, wherein the estimation unit is configured to estimate the impact point, according to a head speed when the golf club is swung, in addition to the characteristic value.

7. The impact point estimation apparatus according to claim 1, wherein:
the acquisition unit is configured to acquire angular velocity data about an x-axis and angular velocity data about a z-axis, and
the x-axis and the z-axis are included in a plane that is generally parallel to the face surface.

8. The impact point estimation apparatus according to claim 7, wherein the z-axis extends parallel to a direction in which the shaft extends.

9. The impact point estimation apparatus according to claim 1, wherein the estimation unit is configured to calculate one or a plurality of the characteristic values based on the sensor data acquired in the analysis period, and estimate the impact point, based on a predetermined regression equation or multiple regression equation in which the one or plurality of characteristic values are explanatory variables and the impact point is an objective variable.

10. The impact point estimation apparatus according to claim 1, wherein the estimation unit is configured to:
estimate an impact point on a first direction based on a predetermined multiple regression equation in which the first characteristic value and the second characteristic value are explanatory variables and the impact point on the first direction is an objective variable, and
estimate an impact point on a second direction based on a predetermined multiple regression equation in which the first characteristic value and the second characteristic value are explanatory variables and the impact point on the second direction is an objective variable, the first direction and the second direction substantially extending on the face surface and being substantially orthogonal with each other.

11. A non-transitory computer readable medium storing an impact point estimation program for estimating an impact point on a face surface of a head when a golf club having a grip, a shaft and the head is swung and hits a golf ball, the program causing a computer to execute the steps of:
acquiring time series sensor data that is output from at least one of an angular velocity sensor and an acceleration sensor that is attached to at least one of the grip and the shaft;

calculating a characteristic value of an initial stress wave that occurs due to impact, based on the sensor data acquired in an analysis period including an initial period after impact; and estimating the impact point on the face surface, according to the characteristic value, wherein the analysis period includes only a period after impact and before 0.005 seconds have elapsed from impact, and wherein the characteristic value includes a first characteristic value of an angular velocity about a first axis and a second characteristic value of an angular velocity about a second axis as characteristic values of the initial stress wave that occurs due to impact, and the first and second characteristic values are determined based on the sensor data acquired in the analysis period, the first axis and the second axis being included in a plane that is generally parallel to the face surface and being substantially orthogonal with each other.

12. The non-transitory computer readable medium according to claim 11, wherein the estimating includes:

estimating an impact point on a first direction based on a predetermined multiple regression equation in which the first characteristic value and the second characteristic value are explanatory variables and the impact point on the first direction is an objective variable; and estimating an impact point on a second direction based on a predetermined multiple regression equation in which the first characteristic value and the second characteristic value are explanatory variables and the impact point on the second direction is an objective variable, the first direction and the second direction substantially extending on the face surface and being substantially orthogonal with each other.

13. An impact point estimation apparatus for estimating an impact point on a face surface of a head when a golf club having a grip, a shaft and the head is swung and hits a golf ball, comprising:

an acquisition unit configured to acquire time series sensor data that is output from at least one of an angular velocity sensor and an acceleration sensor that is attached to at least one of the grip and the shaft;

a calculation unit configured to calculate at least one characteristic value of a first wave to a third wave of a stress wave that occurs due to impact, based on the sensor data acquired in an analysis period, the analysis period including only a period after impact and before 0.005 second have elapsed from impact; and an estimation unit configured to estimate the impact point on the face surface, according to the characteristic value, wherein the at least one characteristic value includes a first characteristic value of an angular velocity about a first axis and a second characteristic value of an angular velocity about a second axis as characteristic values of the initial stress wave that occurs due to impact, and the first and second characteristic values are determined based on the sensor data acquired in the analysis period, the first axis and the second axis being included in a plane that is generally parallel to the face surface and being substantially orthogonal with each other.

14. The impact point estimation apparatus according to claim 13, wherein the calculation unit is configured to calculate the characteristic value of the first wave of the stress wave that occurs due to impact, based on the sensor data acquired in the analysis period.

15. The impact point estimation apparatus according to claim 13, wherein the estimation unit is configured to:

estimate an impact point on a first direction based on a predetermined multiple regression equation in which the first characteristic value and the second characteristic value are explanatory variables and the impact point on the first direction is an objective variable, and estimate an impact point on a second direction based on a predetermined multiple regression equation in which the first characteristic value and the second characteristic value are explanatory variables and the impact point on the second direction is an objective variable, the first direction and the second direction substantially extending on the face surface and being substantially orthogonal with each other.

* * * * *